United States Patent [19]
Momose et al.

[11] Patent Number: 5,959,742
[45] Date of Patent: *Sep. 28, 1999

[54] FACSIMILE APPARATUS

[75] Inventors: Masanori Momose, Tokyo; Toru Maeda, Mitaka; Hitoshi Saito, Yokohama; Shinichiro Kori, Kawasaki; Masashi Kimura, Kawasaki; Koichiro Ohtsuka, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/522,914

[22] Filed: Sep. 1, 1995

[30] Foreign Application Priority Data

| Sep. 2, 1994 | [JP] | Japan | 6-209797 |
| Sep. 2, 1994 | [JP] | Japan | 6-209798 |
| Sep. 2, 1994 | [JP] | Japan | 6-209799 |
| Dec. 13, 1994 | [JP] | Japan | 6-332709 |

[51] Int. Cl.⁶ .................................. H04N 1/40
[52] U.S. Cl. .................. 358/449; 358/451; 399/370; 399/376

[58] Field of Search ................... 358/449, 448, 358/451, 452; 399/370, 376, 389

[56] References Cited

U.S. PATENT DOCUMENTS

| 5,287,159 | 2/1994 | Sakakibara | 399/376 |
| 5,289,236 | 2/1994 | Yoshino | 358/300 |
| 5,319,470 | 6/1994 | Shukunami | 358/451 |
| 5,467,203 | 11/1995 | Kawata | 358/451 |

FOREIGN PATENT DOCUMENTS 07231386  8/1995  Japan .

*Primary Examiner*—Thomas D. Lee
*Attorney, Agent, or Firm*—Fitzpatrick Cella Harper & Scinto

[57] ABSTRACT

In a recording apparatus with plural sheet cassettes of different sizes, a cassette selecting method consists of calculating cassette information for each cassette based on the length and width of the image to be recorded, comparing the cassette information for the different cassettes and selecting an optimum cassette according to the comparison. The cassette information becomes larger in magnitude as the priority for selection becomes higher, represent various image forming modes.

22 Claims, 26 Drawing Sheets

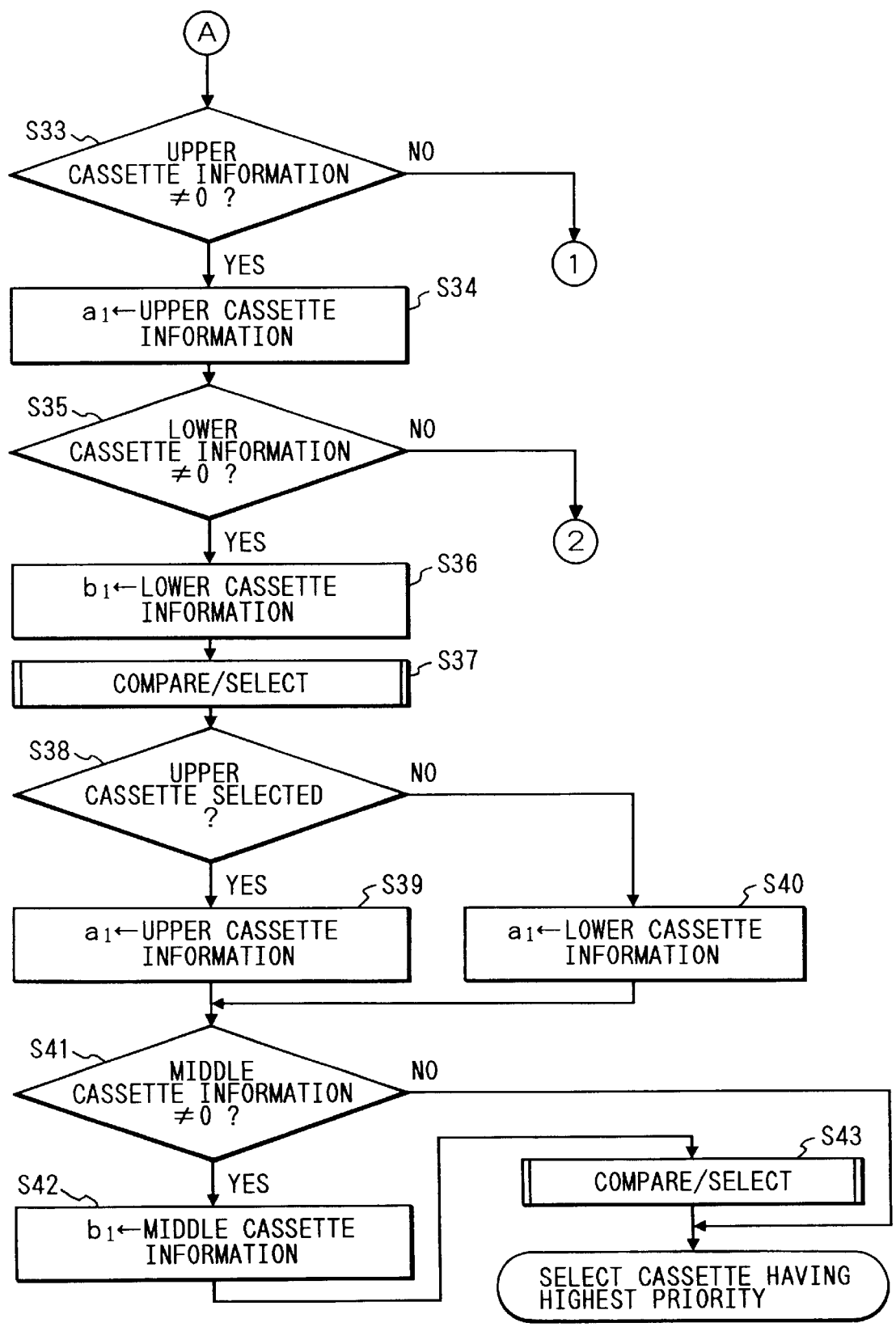

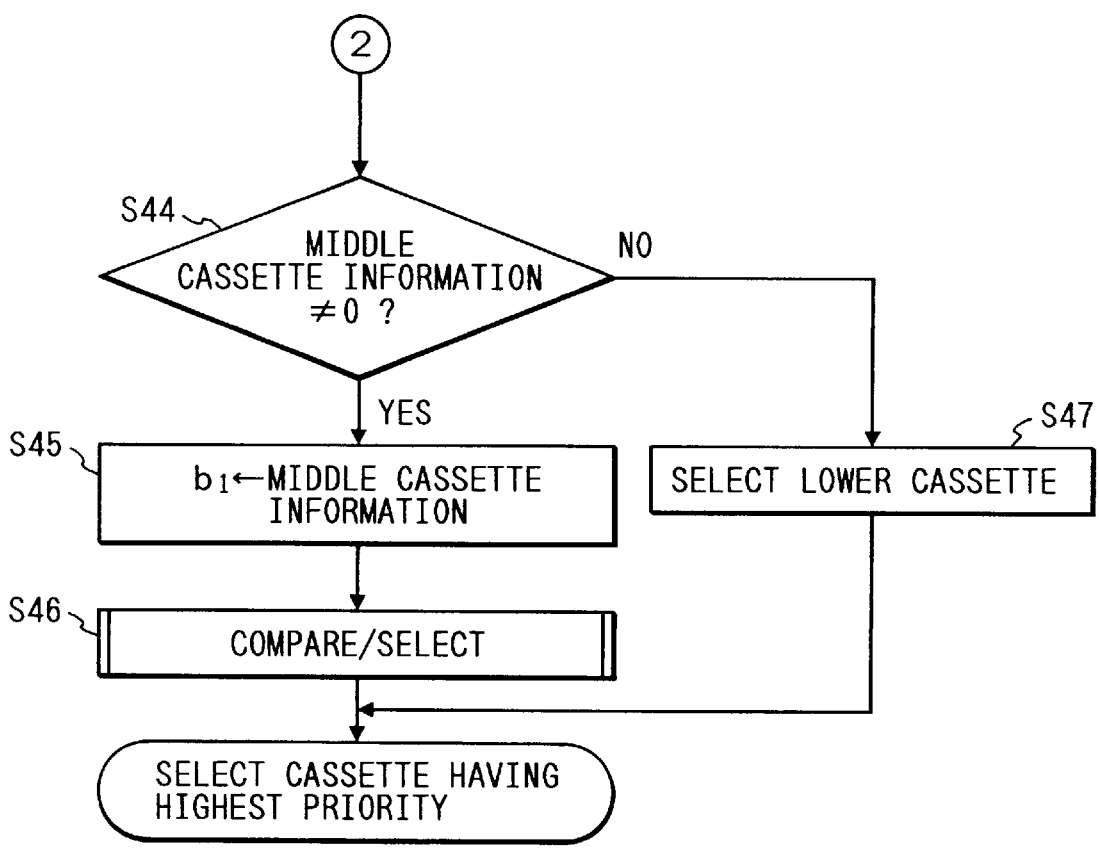

FIG. 9

◎ PREFERENCE ORDER (CUT-OFF) > (MARGIN) > (REDUCTION) > (B4 TO A4 REDUCTION) > (DIVISION)

| | DIVISION | B4 TO A4 REDUCTION | REDUCTION PREFERENCE | EQUAL-SIZE | MARGIN | CUT-OFF | |
|---|---|---|---|---|---|---|---|
| 1 | 1 | 1 | 0 | 1 | 1 | 1 | CUT-OFF |
| 2 | 1 | 1 | 0 | 1 | 1 | 0 | MARGIN |
| 3 | 1 | 1 | 0 | 1 | 0 | 1 | REDUCTION |
| 4 | 1 | 1 | 0 | 0 | 1 | 1 | B4 TO A4 REDUCTION |
| 5 | 1 | 0 | 0 | 1 | 1 | 1 | DIVISION |
| 6 | 0 | 1 | 0 | 1 | 1 | 1 | |

| FIG. 19A |
|----------|
| FIG. 19B |

FIG. 20

| REGISTRATION/ SETTING ITEM | CONTENTS | VALUES ('*' INDICATES DEFAULT VALUE) |
|---|---|---|
| SELECTION OF CASSETTE | DESIGNATE PAPER SIZE OF CASSETTE | 'ON' INDICATES 'ENABLE' |
| (SWITCH A=ON) | SELECT WHETHER TO DIVIDE RECEIVED B4/A4 ORIGINAL INTO B5/A5 FOR PRINTING OUT OR NOT (B4, B5;A4, A5 CASSETTES BUILT IN) | ON * OFF |
| (SWITCH B=ON) | SELECT WHETHER TO PRINT B5/A5 ORIGINAL ON B4/A4 WITH MARGIN OR NOT (B4, B5;A4, A5 CASSETTES BUILT IN) | ON * OFF |
| (SWITCH C=ON) | SELECT WHETHER TO REDUCE B-SIZE ORIGINAL TO A-SIZE FOR PRINTING OUT OR NOT (B4, A4;B5, A4 CASSETTES BUILT IN) | ON * OFF |
| (SWITCH D=ON) | SELECT WHETHER TO PRINT A-SIZE ORIGINAL ON B-SIZE PAPER OR NOT (B4, A4;B5, A4 CASSETTES BUILT IN) | ON * OFF |
| REDUCTION OF IMAGE | SELECT WHETHER TO REDUCE RECEIVED IMAGE FOR PRINTING OUT OR NOT | YES * NO |
| (SELECTION OF REDUCTION MODE) | SELECT FIXED REDUCTION MODE OR AUTO REDUCTION MODE WHEN 'REDUCTION OF IMAGE' IS SELECTED | AUTO * FIXED |
| (SELECTION OF REDUCTION FACTOR %) | DESIGNATE REDUCTION FACTOR BY '▲' OR '▼' KEY WHEN 'FIXED REDUCTION MODE' IS SELECTED | 90% * 97% 95% |
| (SELECTION OF REDUCTION DIRECTION) | SELECT DIRECTION OF IMAGE REDUCTION | VERT. ONLY * VERT. AND HORIZ. |

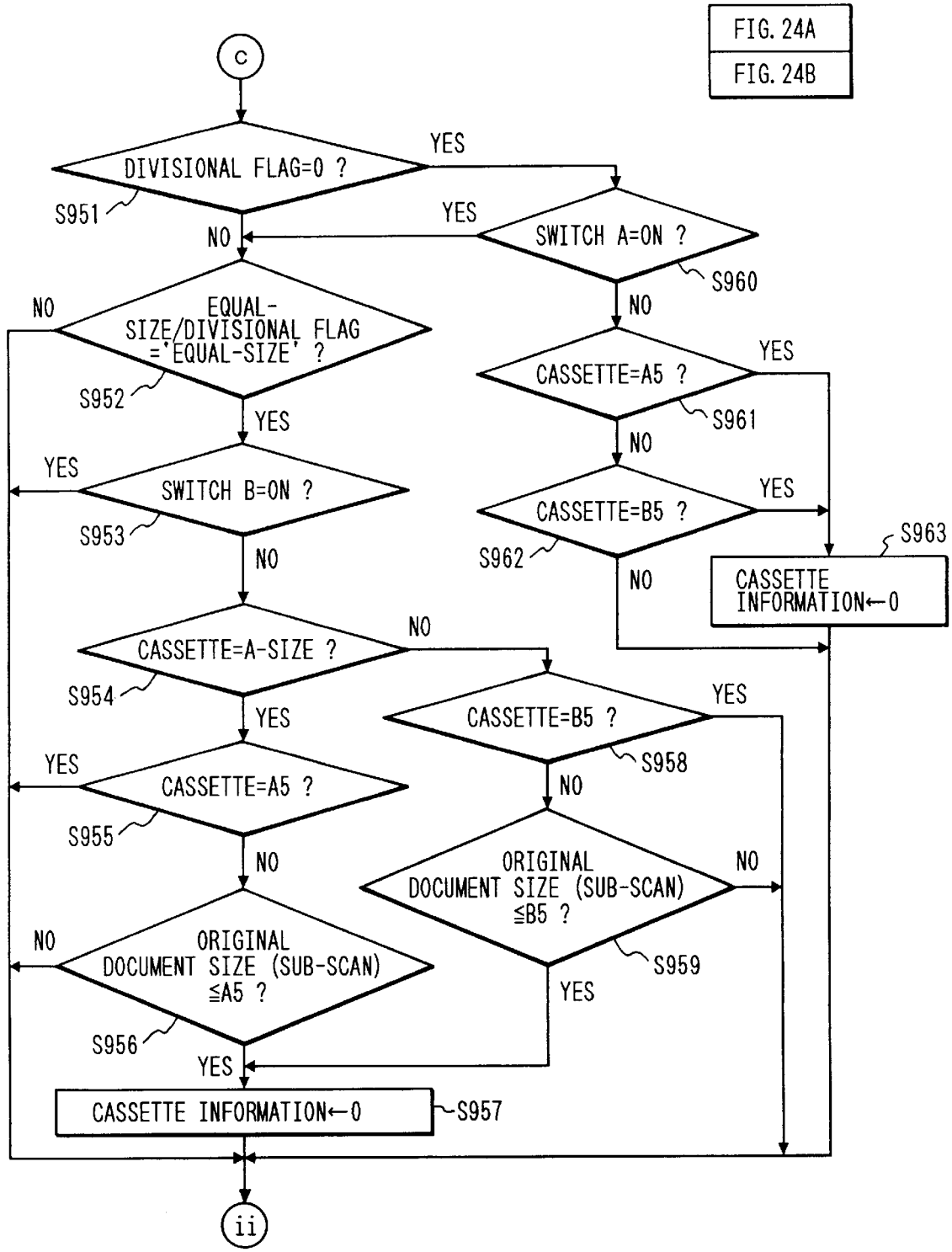

FACSIMILE APPARATUS

BACKGROUND OF THE INVENTION

1. Field of the Invention

The present invention relates to a facsimile apparatus, and also to a recording apparatus for effecting recording by automatically selecting one of plural cassettes.

2. Related Background Art

In a recording device provided in a conventional facsimile apparatus or copying apparatus, selection of one of plural cassettes has been achieved by limiting candidate cassettes from all the cassettes according to the main scanning length of a record image, and then selecting an optimum cassette according to the sub scanning length.

Also the order of priority of the cassette selection is always fixed in the apparatus.

However, in case there is a change in the condition of cassette selection, for example in case an optimum cassette is to be selected according to the sub scanning length regardless of the main scanning width of the record image, the above-mentioned conventional method for limiting the cassettes at first by the main scanning length is no longer usable.

On the other hand, if plural conditions are adopted for cassette selection and are judged in succession, similar judgment processes have to be repeated, for example, at first in the main scanning direction, then in the sub scanning direction and again in the main scanning direction, for selecting the optimum cassette, so that there is required a very complex selecting logic though additional flexibility can be obtained in setting the conditions for cassette selection.

Also in case the number of the cassettes is increased, there is required an even more complex process, as the judgment for such added cassette has to be added in the judgments for the main and sub scanning directions.

Also in the conventional apparatus, the order of priority of cassette selection is fixed as explained above, and cannot be altered according to the purpose of use.

Also conventional size-reduced recording is generally conducted with a constant reduction ratio. On the other hand, the present applicant has proposed, in the Japanese Patent Application No. 6-41990, filed Feb. 16, 1994 in Japan, to reduce the sub scanning length of a received image matching the length of a recording sheet.

Also in the conventional facsimile apparatus, a reduction rate cannot be selected by an operator. In case a received image is larger than a recording sheet, the maximum reduction rate permissible in consideration of the legibility depends on an original image. For this reason, the received image has been often inadequate for reading as frequently received images do not match the maximum reduction rate designed in the apparatus.

Also an output image has not been well legible when the main scanning width of a received/read original image corresponds to B4 size while the recording sheet is of A4 size, or when the sub scanning length cannot be accommodated in the recording sheet of A4 size, namely when the length of the received/read original image is larger than that of the recording sheet of B4 size.

Also, even when the length of the received/read original image is smaller than the length of the recording sheet, the effective recording range of the recording sheet becomes smaller than the actual sheet length if margins or receive-information data (footer) are added, and, in such case the entire received/read image cannot be recorded on the recording sheet in the original size (equal-size).

SUMMARY OF THE INVENTION

The object of the present invention is to provide a recording apparatus capable of easy selection of the cassette.

BRIEF DESCRIPTION OF THE DRAWINGS

FIG. 2 to FIG. 4B are flow charts showing the cassette selecting method in said embodiment;

FIG. 9 is a table showing a representative example of the order of priority of the cassette in said embodiment;

FIG. 20 is a table showing the setting items for an eleventh embodiment.

FIGS. 21 to 23, 24A and 24B, combined as shown in FIG. 24 are flow charts showing an operation of the eleventh embodiments.

DESCRIPTION OF THE PREFERRED EMBODIMENTS

[1st embodiment]

Figure 1:
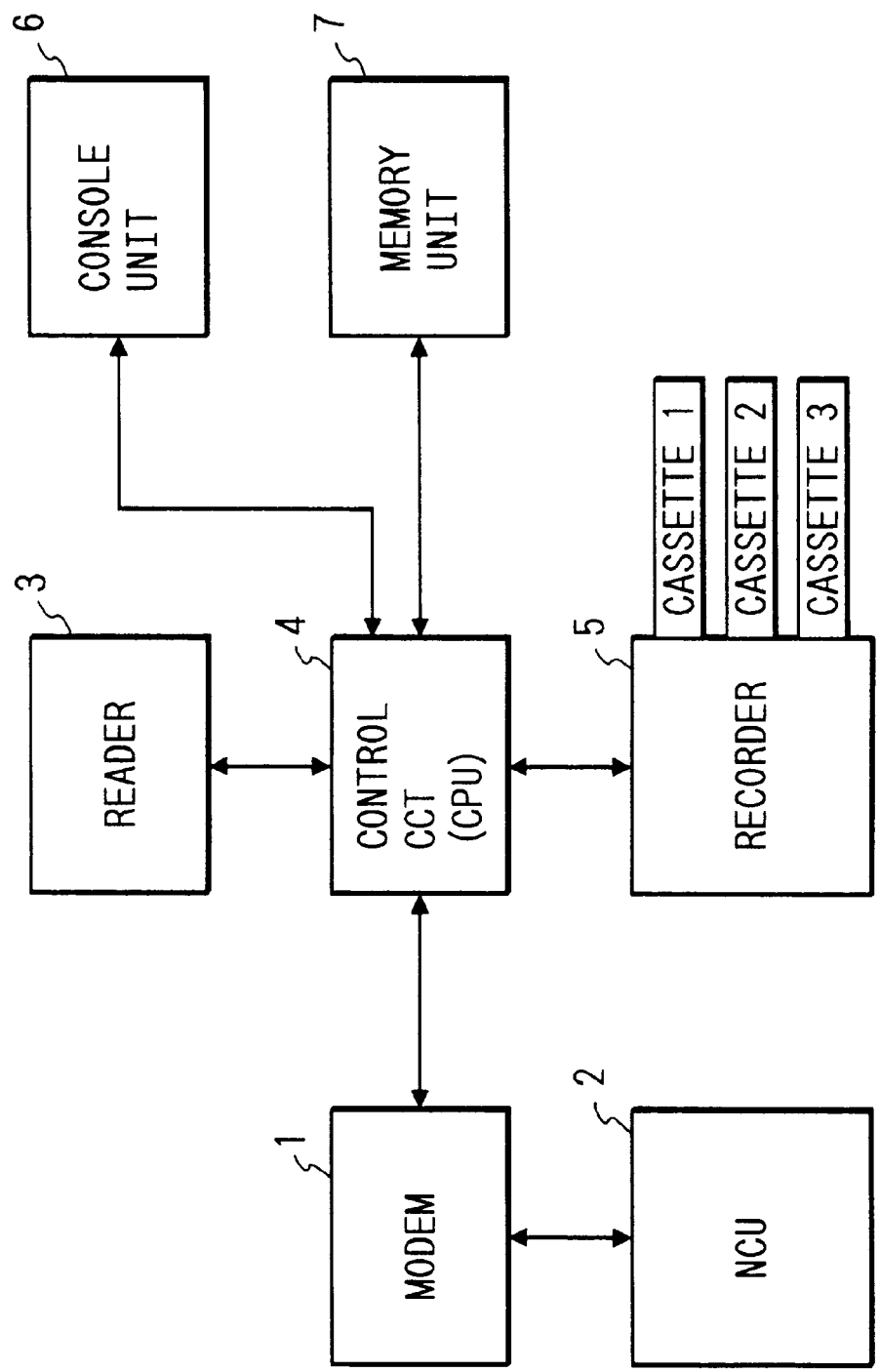
FIG. 1 is a block diagram of an embodiment of the present invention.
Figure 2:
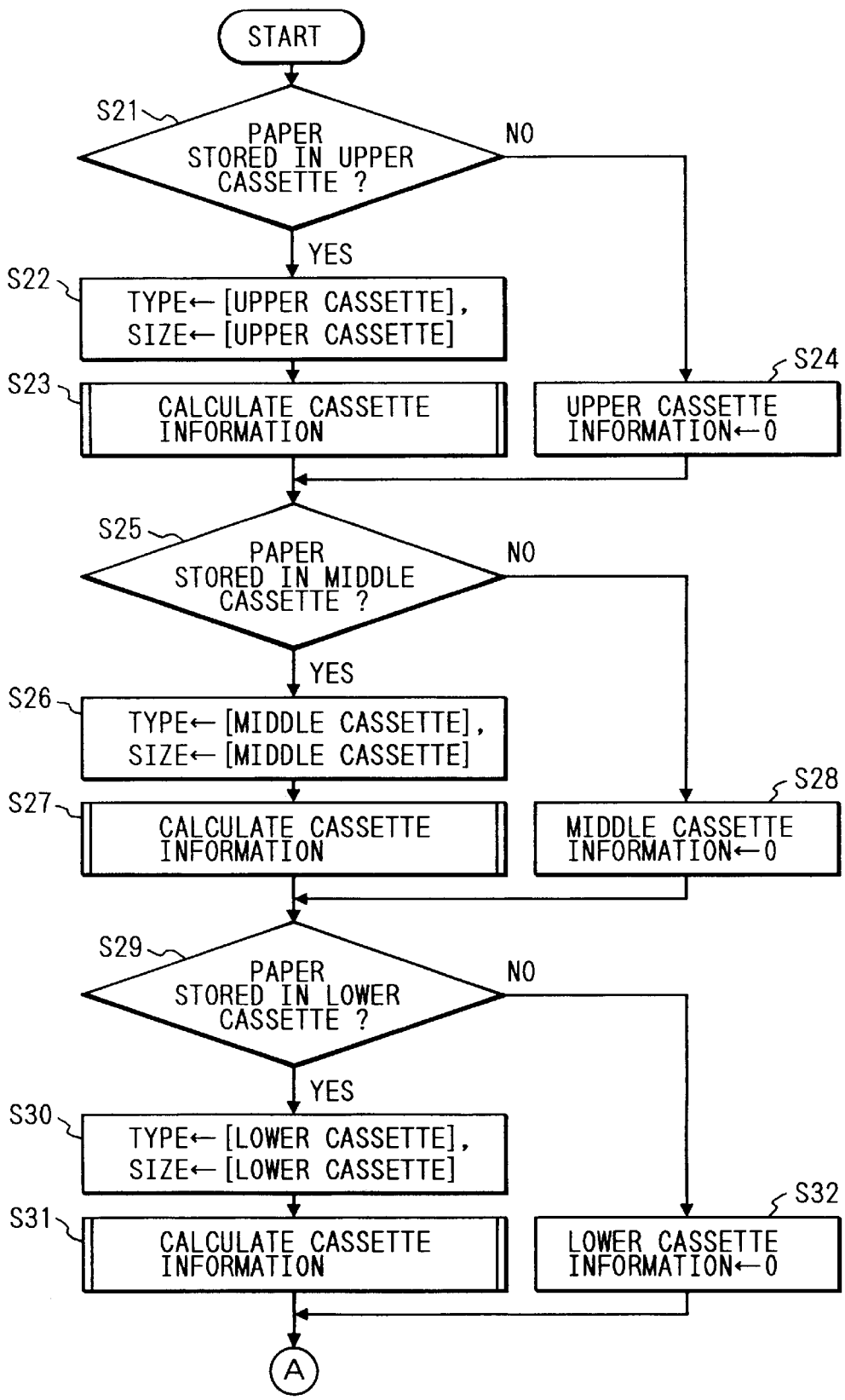
Figure 4A:
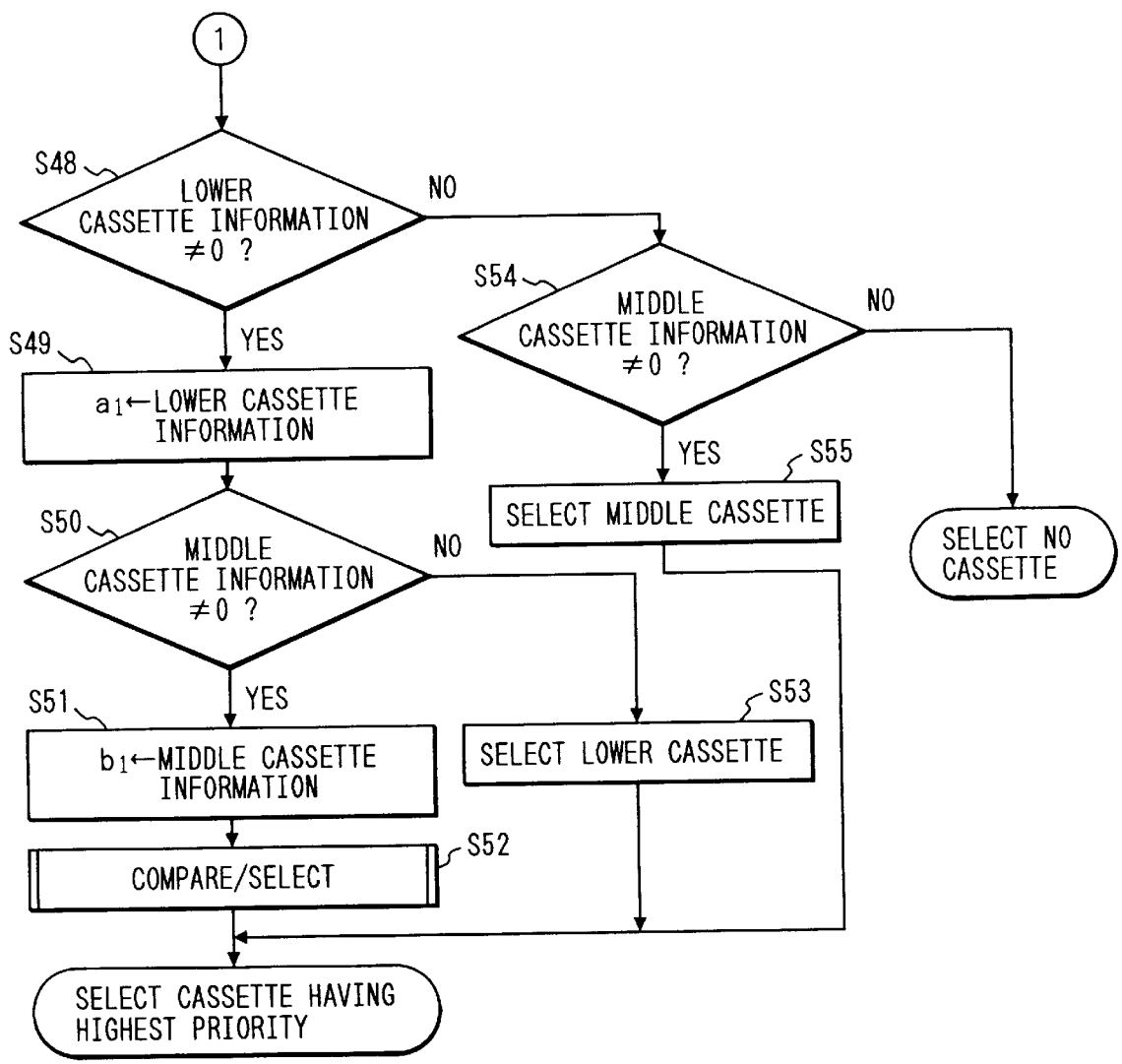

FIG. 1 is a schematic block diagram of a facsimile apparatus provided with a recording device and constituting an embodiment of the present invention.

Said facsimile apparatus is provided with a control circuit (CPU) 4 for controlling the entire apparatus; a memory unit 7 for storing various programs and data; a reader unit 3 for reading an original; a recorder unit 5 for forming an image on a recording sheet; a console unit (or an operation unit) 6 provided with an LCD device and a group of various operation keys; a modem 1 for effecting modulation and demodulation of the transmitted and received data; and a network control unit (NCU) for connecting a communication line to a telephone set or to the modem 1.

The recorder unit 5 is so designed as to accommodate three cassettes, or upper, middle and lower ones.

In the copying operation in the above-explained configuration, the reader unit 3 reads an original, and the image thereof is stored in the memory unit 7. Then the control circuit 4 calculates cassette information, based on the information on the width and length of said image and according to the order of priority of the cassette selection in the apparatus, and selects an optimum cassette for image formation by the recorder unit 5.

Also in the receiving operation, image data are received from the communication line through the NCU2 and the modem 1 and are stored in the memory unit 7.

The image formation is thereafter conducted in the same manner as in the copying operation.

In the console unit 6, the order of priority of cassette selection of the apparatus can be altered by a registration switch (not shown).

FIGS. 2 to 4B are flow charts showing the cassette selecting method in the present embodiment.

At first, if a step S21 identifies that the upper cassette contains a recording sheet, a cassette type is set to the upper cassette and the size is set to that of the upper cassette (S22), and the cassette information thereof is calculated (S23). If the upper cassette contains no sheet, the upper cassette information is set to "0" (S24) and the upper cassette is excluded from the selection.

Then, if a step S25 identifies that the middle cassette contains a sheet, the type is set to the middle cassette and the size is set to that of the middle cassette (S26), and the cassette information thereof is calculated (S27). If the middle cassette contains no sheet, the middle cassette information is set to "0" (S28) and the middle cassette is excluded from the selection.

Then the cassette information is similarly calculated for the lower cassette (S29–S32).

Subsequently, if a value is set for the upper cassette information (S33), said information is set as a variable $a_1$ (S34). Also if a value is set for the lower cassette information (S35), said information is set as a variable $b_1$ (S36). Then a cassette comparison process (S37) compares the values of the upper and lower cassettes and selects a cassette of the higher priority.

If this selection gives priority to the upper cassette (S38), the upper cassette information is set as the variable $a_1$ (S39), and, if this selection gives priority to the lower cassette, the lower cassette information is set as the variable $a_1$ (S40).

Then, if a value set for the middle cassette information (S41), said information is set as the variable $b_1$ (S42). Then the cassette comparison is conducted once again (S43), and a cassette of the highest priority is selected.

In case the above-mentioned step S35 identifies that no value is set for the lower cassette information, and if a value is set for the middle cassette information (S44), said information is set as the variable $b_1$ (S45). Then a cassette comparison process (S46) compares the values of the upper and middle cassettes and a cassette of the higher priority is selected.

Also in case said step S44 identifies that no value is set for the middle cassette, the upper cassette is automatically selected (S47).

In case the step S33 identifies that no value is set for the upper cassette information, and if a value is set for the lower cassette information (S48), said information is set as the variable $a_1$ (S49), and if a value is set for the middle cassette information (S50), said information as the variable $b_1$ (S51). Then a cassette comparison process (S52) compares the values of the middle and lower cassettes and a cassette of the higher priority is selected.

Also in case the step S50 identifies that no value is set for the middle cassette, the lower cassette is selected (S53).

Also in case the above-mentioned step S48 identifies that no value is set for the lower cassette, if a value is set for the middle cassette information (S54), the middle cassette is selected (S55).

Also in case the step S54 identifies that no value is set for the middle cassette, none of the cassettes is selected.

The cassette selection is executed in the above-explained sequence.

The cassette comparison process is to compare the magnitude of the cassette information represented by the variables $a_1$ and $b_1$ and to select a cassette of a larger value.

Figure 5:
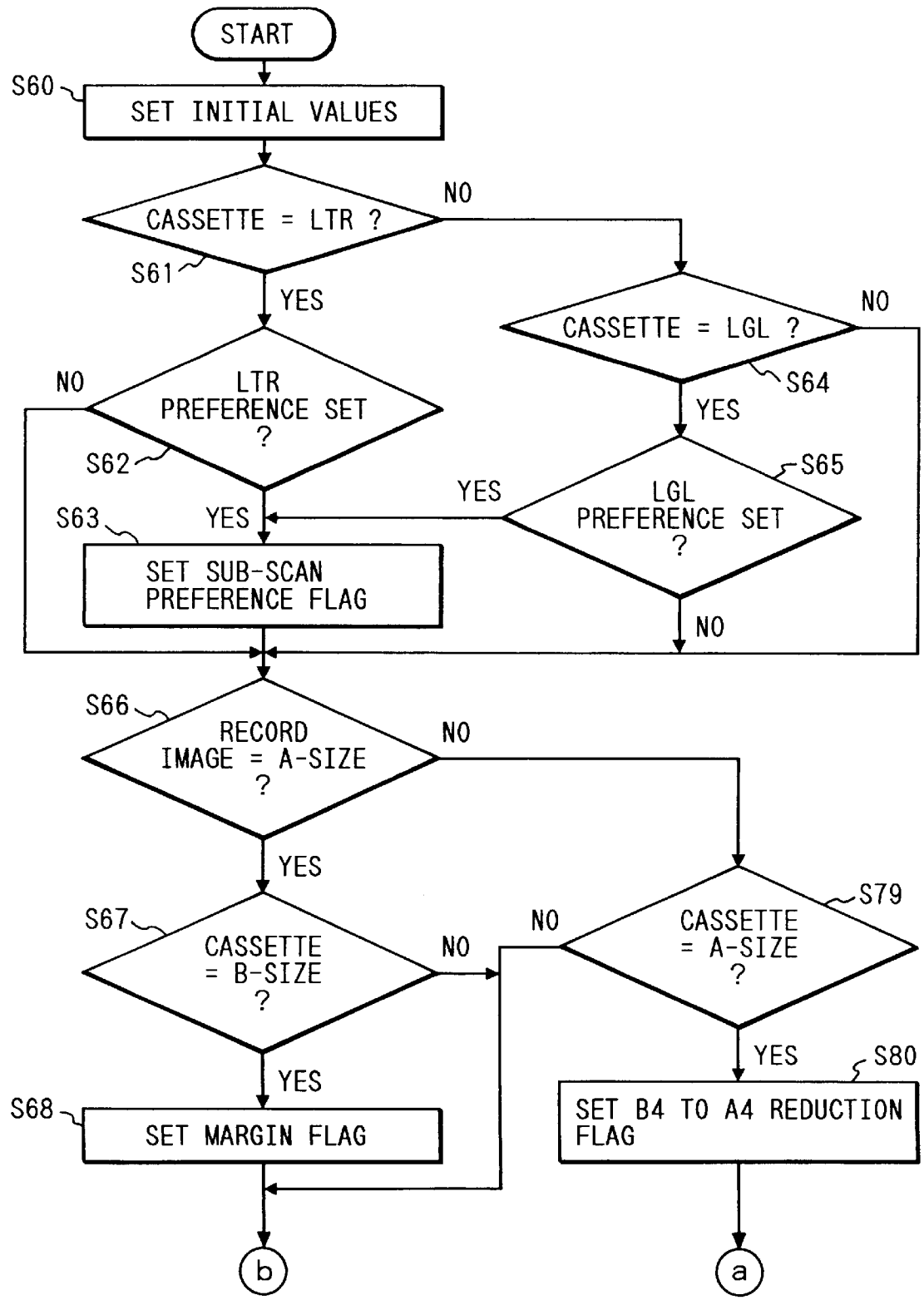
FIGS. 5 to 7 are flow charts showing the calculating method for the cassette information in the cassette selection in said embodiment.
Figure 6:
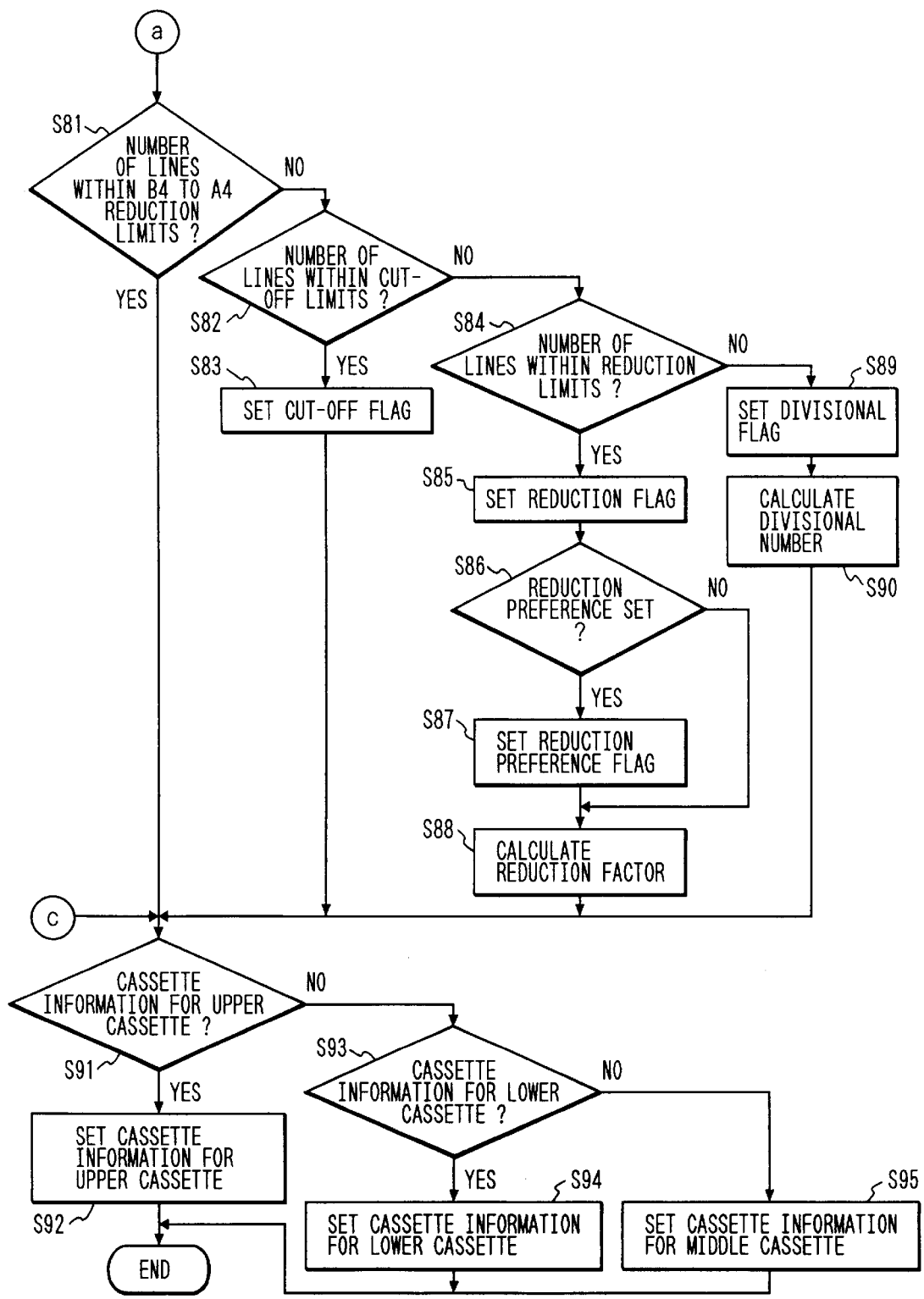
Figure 7:
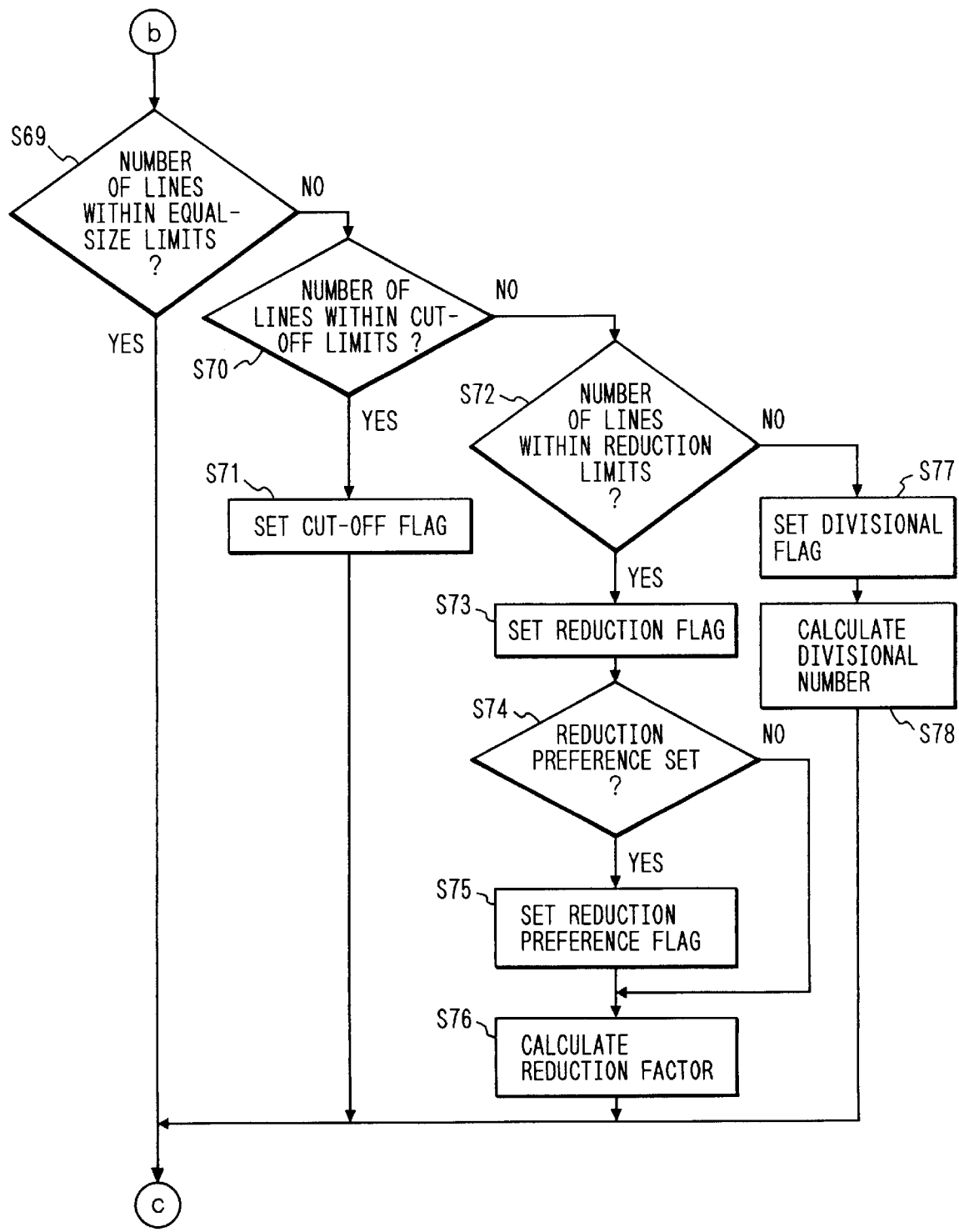

FIGS. 5 to 7 are flow charts showing the calculation process for the cassette information, in the cassette selection of the present embodiment.

At first an initial value of the cassette information (FIG. 8) is set (S60), and, if the cassette is of letter (LTR) size (S61) and if a LTR preferential mode is set by a registration switch (S62), there is set a sub-scan preferential flag is set in the cassette information (S63).

On the other hand, if the cassette is of legal (LGL) size (S64) and if a LGL preferential mode is set by the registration switch (S65), the sub-scan preferential flag is similarly set (S63).

If the record image is of an A-series size (S66) and the calculated cassettes are of B-series sizes (S67), a margin flag is set in the cassette information (S68). The margin flag is not set in case the cassettes are of the A-series sizes.

Then, if the number of lines of the image is within the range of equal-size recording (S69), an equal-size flag is retained in the initially set state. If it exceeds the range of equal-size recording but is within a cut-off range (S70), a cut-off flag is set (S71).

Also if it exceeds the cut-off range but is within an image reduction range (S72), a reduction flag is set (S73), and, if a reduction preferential mode is set by the registration switch (S74), a reduction preferential flag is set (S75). The reduction preferential flag is not set if the reduction preferential mode is not set.

Subsequently the reduction rate is calculated from the number of lines and the cassette size (S76) and is set in the cassette information.

In case the number of lines of the image cannot be accommodated within the image reduction range, a division flag is set (S77), then the number of division is calculated from the number of lines and the cassette size, and the complementary number of said number of division is set in the cassette information (S78).

In case a step S66 identifies that the width of the recorded image is of a B-series size, the sequence proceeds to the step S33, and, if the cassette size of an A-series size (S79), a B4→A4 reduction flag is set (S80). Then, if the number of lines of the image is within a B4→A4 reduction range (S81), the equal-size flag is retained in the initially set state, but, if it exceeds the B4→A4 reduction range but within a B4→A4 cut-off range (S82), a cut-off flag is set (S83).

If it exceeds said cut-off range, steps S84 to S90 are executed in a similar manner as the steps S72 to S78.

In case the above-mentioned step S79 identifies that the cassette of a B-series size, the sequence proceeds to the step S69.

The calculation of the cassette information is completed in the foregoing sequence. Then, if the calculation is made for the upper cassette (S91), the cassette information is set to that of the upper cassette (S92). If it is made for the lower cassette (S93), the cassette information is set to that of the lower cassette (S94). If it is made for another cassette, the cassette information is set to that of the middle cassette (S95) and the sequence is terminated.

Figure 8:
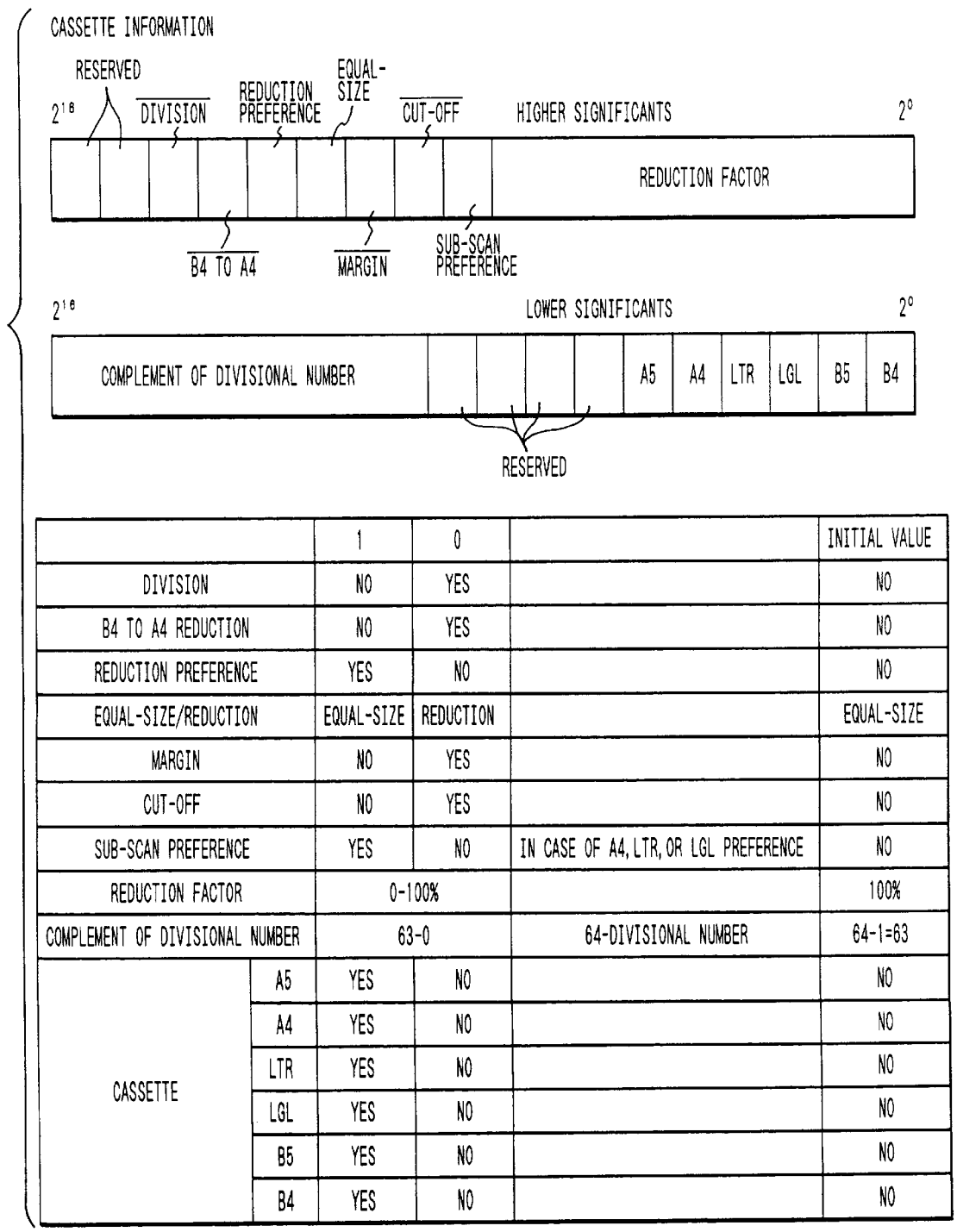
FIG. 8 is a table showing the details of the cassette information in said embodiment.

FIG. 8 is a table showing the details of the content of the cassette information.

The order of priority of cassette selection is selected as: equal size>cut-off>margin>reduction>B4→A4 reduction>division, and the flags representing these states are provided, as shown in FIG. 8, in the order of division, B4→A4 reduction (reduction preferential), equal-size, margin and cut-off.

A reduction preferential bit is set only when image reduction is selected by the setting of the reduction preferential mode by the registration switch.

A sub-scan preferential bit is set only when the LTR (LGL) preferential mode is set by the registration switch and the cassette is of the LTR (LGL) size.

These bits are followed by a reduction factor and a complement of the division number. The reduction factor is represented by a hexadecimal number from 0 to 100%, and the complement of the division number is represented by a hexadecimal number equal to (64 - number of divisions).

Finally, cassette status information relating to the sub scanning size are given, in the order of priority of A5, A4, LTR, LGL, B5 and B4.

The initial setting for the cassette information calculation is as shown in FIG. 8.

FIG. 9 is a table showing representative examples of the order of priority of the cassettes.

The 1st priority is given to the equal-size recording. The 2nd is given to the recording with cut-off, the 3rd to the recording with margin, the 4th to the recording with size reduction, the 5th to the recording with B4→A4 size reduction, and the 6th to the recording with area division.

The cassette selection is till possible even with an increase in the cassette sizes (for example A3, B3, B6 etc.), by the addition of cassette status to the cassette information.

Also the cassette selection can accommodate additional selecting conditions, such as A3–B4 size reduction, A3–A4 size reduction, equal-size/enlargement or unenlargement factor, by adding suitable flags and enlargement factor to the cassette information.

Furthermore, other additional conditions for cassette selection can also be accommodated by an increase in the number of words (for example, 3 words or 4 words) constituting the cassette information.

Also an increase in the number of cassettes can be accommodated by the addition of the cassette information for such added cassette.

As explained in the foregoing, the 1st embodiment enables cassette selection in simple manner even for an increased number of cassettes, by calculating the cassette information, representing the level of priority for each cassette and comparing the calculated cassette information.

Also in case the apparatus includes a cassette capable of equal-size recording of an original image and a cassette capable of reduced-size recording for said original image, the priority for such recordings can be altered by the registration switch for changing the order of priority of the cassette selection.

Similarly, in case the apparatus includes a cassette for A4-size recording and a cassette for letter-size recording (under same recording conditions), the order of priority of cassette selection may be altered by the registration switch.

[2nd embodiment]

Figure 10:
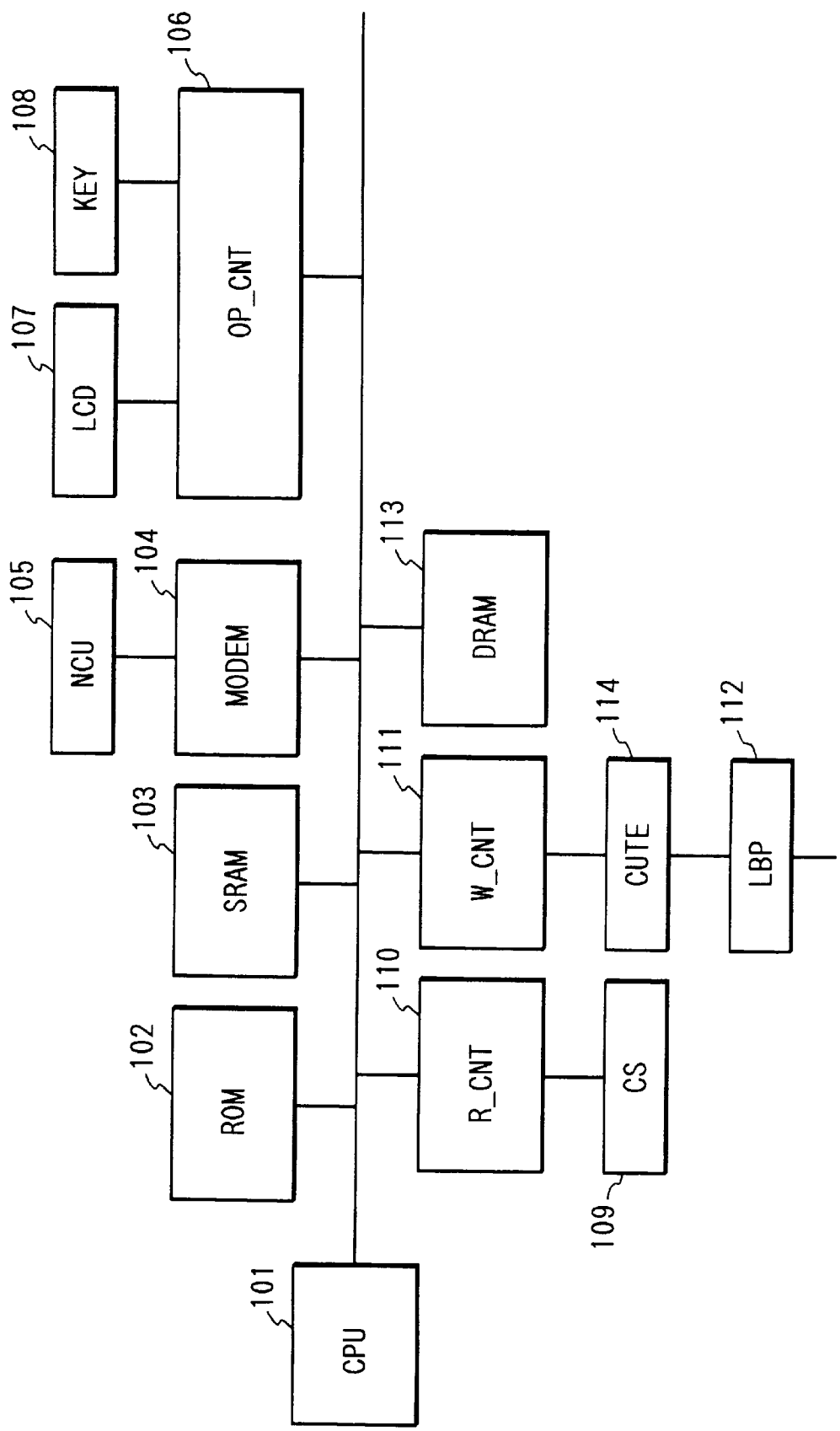
FIG. 10 is a block diagram of a facsimile apparatus constituting a second embodiment of the present invention.

Now reference is made to FIG. 10 for explaining the details of a 2nd embodiment.

A central control unit (CPU) 101 controls the entire apparatus according to programs stored in a ROM 102, and also according to the setting in a SRAM 103, registered by an operator.

An original image is read by a contact sensor (CS) 109, encoded by a reading control gate array (R_CNT) 110 and stored in an image memory (DRAM) 113. A stored image is decoded by a recording control gate array (W_CNT) 111, then reduced in size by a reduction IC (CUTE) 114, and recorded on a recording sheet by a laser beam printer (LBP) 113. Otherwise it is PM-AM modulated by a MODEM 114 and released to a communication line through an NCU 105.

Received image data are supplied, through the NCU 105, to the MODEM 104 for demodulation, decoding and image error inspection, and, if the data are proper, they are encoded and stored in the DRAM 113. The stored image is decoded by the recording control gate array (W_CNT) 111, then reduced in size by the reduction IC (CUTE) 114 according to the registered content of the SRAM 103 and recorded on the recording sheet by the laser beam printer (LBP) 112.

The operator can enter various instructions or settings by the actuation of keys 108, and the contents of such instructions/settings are stored in the SRAM 103 and can be confirmed on the display unit (LCD) 107. The CPU 101 detects the key input data through a panel control gate array (OP_CNT) 106 and displays necessary data on the LCD 107.

Figure 11:
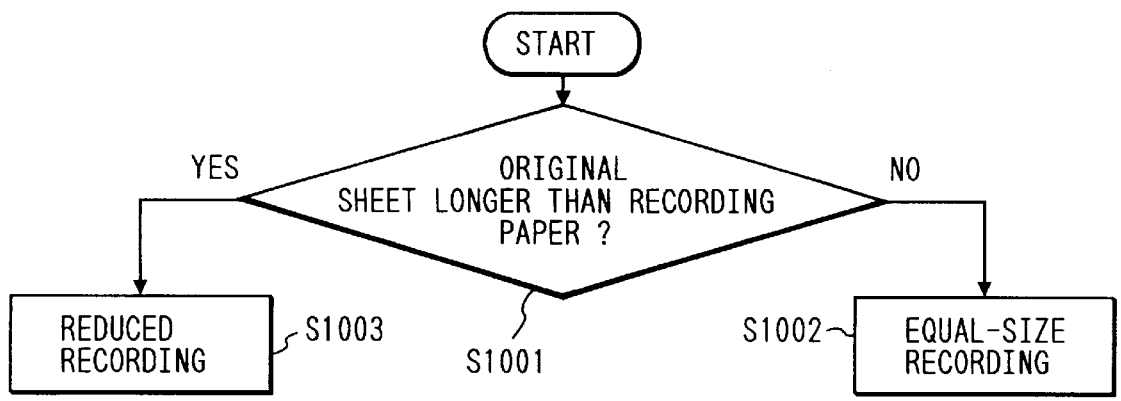
FIG. 11 is a flow chart showing an image reduction process in the second embodiment.

In the following there will be explained the image reduction process in the facsimile apparatus of the 2nd embodiment, with reference to a flow chart in FIG. 11.

At first a step S1001 discriminates whether a received/read original and the recording sheet are different in size, and, if the length of the received/read image is smaller than or equal to that of the recording sheet, equal-size recording is conducted in a step S1002, but, if the length of the received/read image is larger than that of the recording sheet, reduction recording is conducted in a step S1003.

[3rd embodiment]

Figure 12:
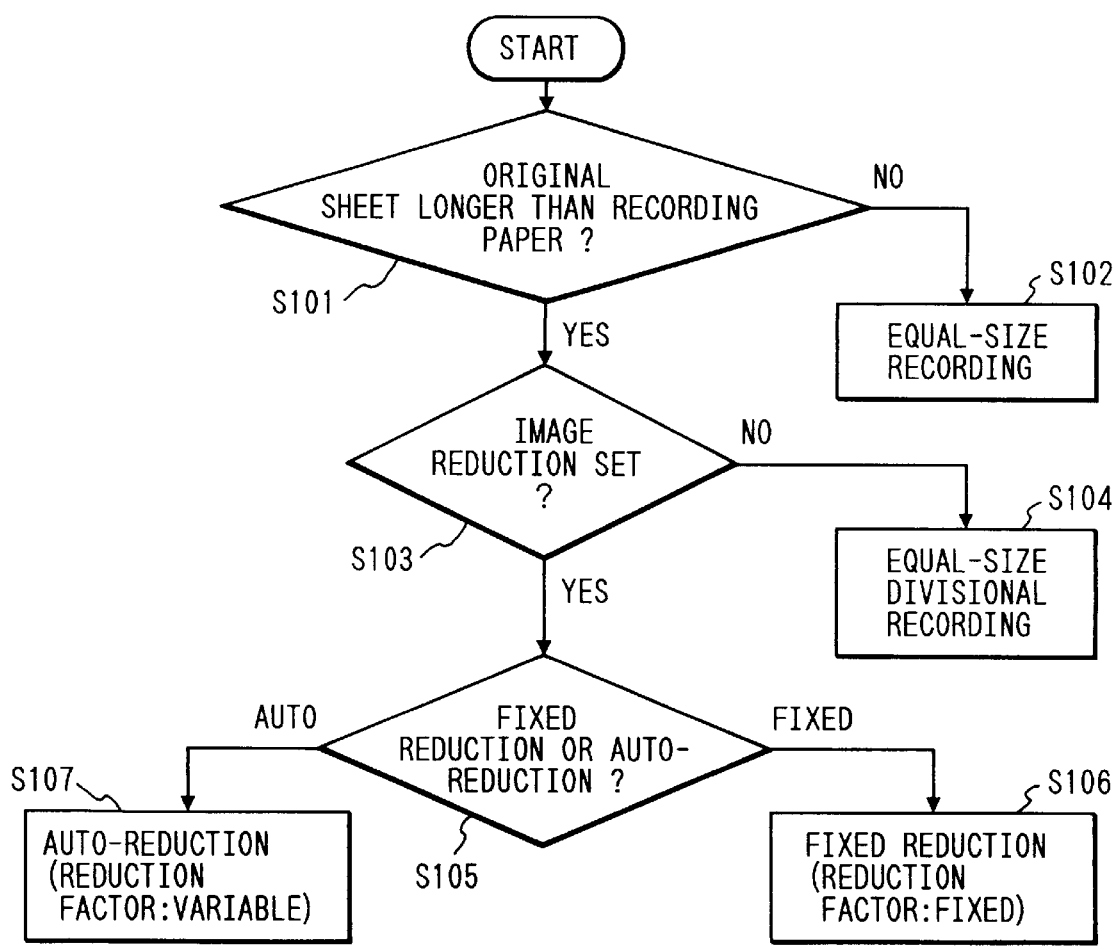
FIG. 12 is a flow chart showing an image reduction process in a third embodiment.

In the following there will be explained the image reduction process in the facsimile apparatus of a 3rd embodiment, with reference to a flow chart in FIG. 12.

At first a step S101 discriminates whether the received/read original and the recording sheet are different in size, and, if the length of the received/read image is smaller than or equal to that of the recording sheet, equal-size recording is conducted in a step S102.

If the length of the received/read image is larger than that of the recording sheet, the CPU 101 discriminates, in a step S103, whether the image reduction is selected or not, according to the content of the SRAM 103, and, if the image reduction is not selected, a step S104 effects equal-size divided recording. If the image reduction is selected, a step S105 discriminates whether "fixed reduction" or "auto reduction" is selected, according to the content of the SRAM 103, and, in case of "fixed reduction", a step S106 effects fixed reduction recording with a fixed reduction factor. In case of "auto reduction", a step S107 determines the reduction factor within a range up to a maximum reduction factor by comparing the length of the received/read image with that of the recording sheet, and effects auto reduction recording.

[4th embodiment]

Figure 13:
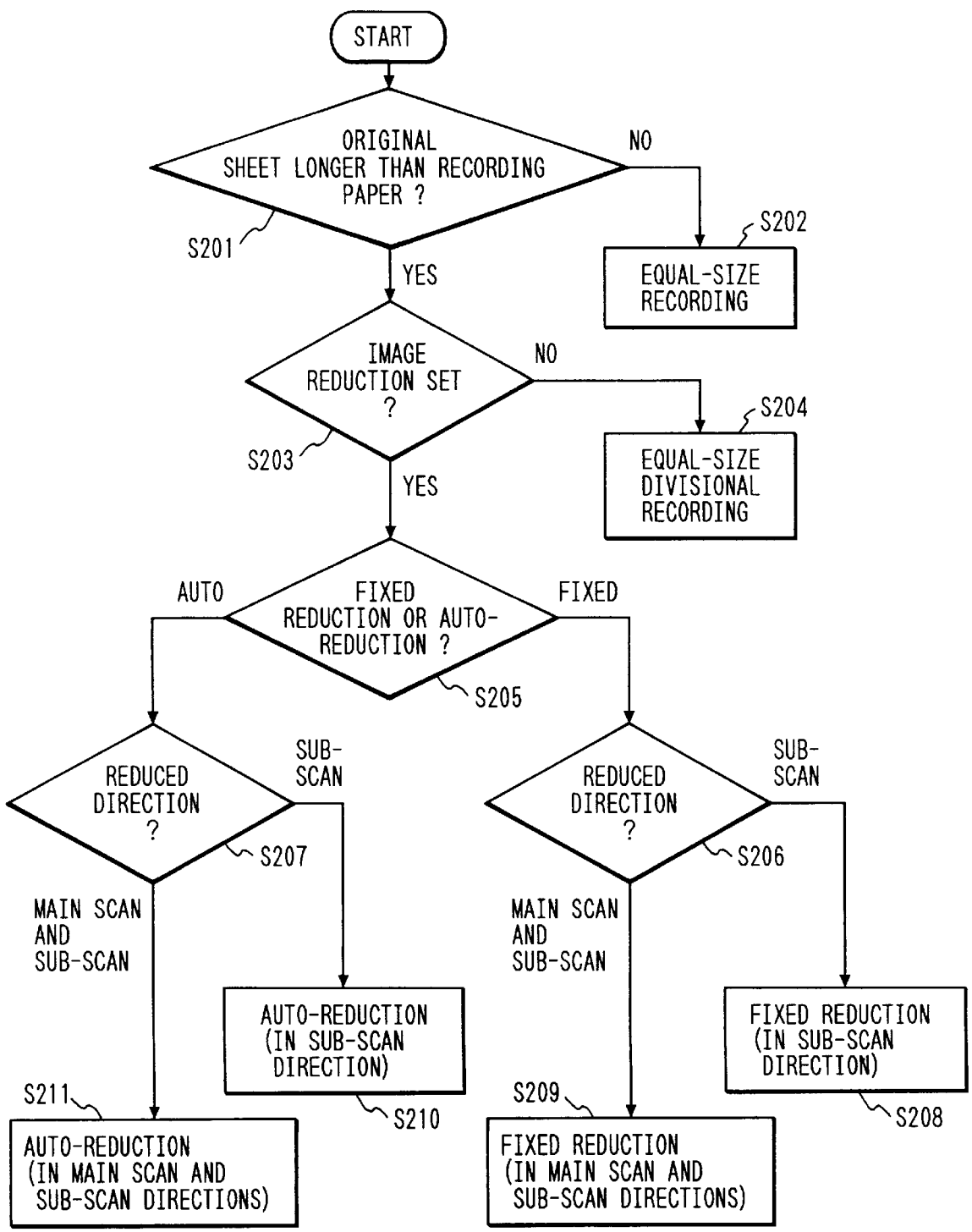
FIG. 13 is a flow chart showing an image reduction process in the fourth embodiment.

In the following there will be explained the image reduction process in the facsimile apparatus of a 4th embodiment, with reference to a flow chart in FIG. 13.

At first a step S201 discriminates whether the received/read original and the recording sheet are different in size, and, if the length of the received/read image is smaller than or equal to that of the recording sheet, equal-size recording is conducted in a step S202.

If the length of the received/read image is larger than that of the recording sheet, the CPU 101 discriminates, in a step S203, whether the image reduction is selected or not, according to the content of the SRAM 103, and, if the image reduction is not selected, a step S204 effects equal-size divided recording.

If the image reduction is selected, the CPU 101 discriminates, in a step S205, whether "fixed reduction" or "auto reduction" is selected, according to the content of the SRAM 103. In case of the "fixed reduction", the CPU 101 discriminates, in a step S206, whether a reduction for "vertical only" for reduction in the sub scanning direction only or a reduction for "both vertical/horizontal" for reduction both in the main and sub scanning directions, according to the content of the SRAM 103, and, in case of "vertical only" for reduction only in the sub scanning direction, a step S208 effects fixed reduction recording with a fixed reduction factor only in the sub scanning direction. In case of "both vertical/horizontal" for reduction both in the main and sub scanning directions, a step S209 effects fixed reduction recording with a fixed reduction factor both in the main and sub scanning directions. On the other hand, in case of the "auto reduction", the CPU 101 discriminates, in a step S207, whether a reduction for "vertical only" for reduction in the sub scanning direction only or a reduction for "both vertical/horizontal" for reduction both in the main and sub scanning directions, according to the content of the SRAM 103, and, in case of "vertical only" for reduction only in the sub scanning direction, a step S210 determines the reduction factor within a range up to a maximum reduction factor, by comparing the length of the received/read original and that of the recording sheet and effects auto reduction recording only in the sub scanning direction.

In case of "both vertical/horizontal" for reduction both in the main and sub scanning directions, a step S211 determines the reduction factor within a range up to a maximum reduction factor, by comparing the length of the received/read original and that of the recording sheet, and effects auto reduction recording both in the main and sub scanning directions.

[5th embodiment]

Figure 14:
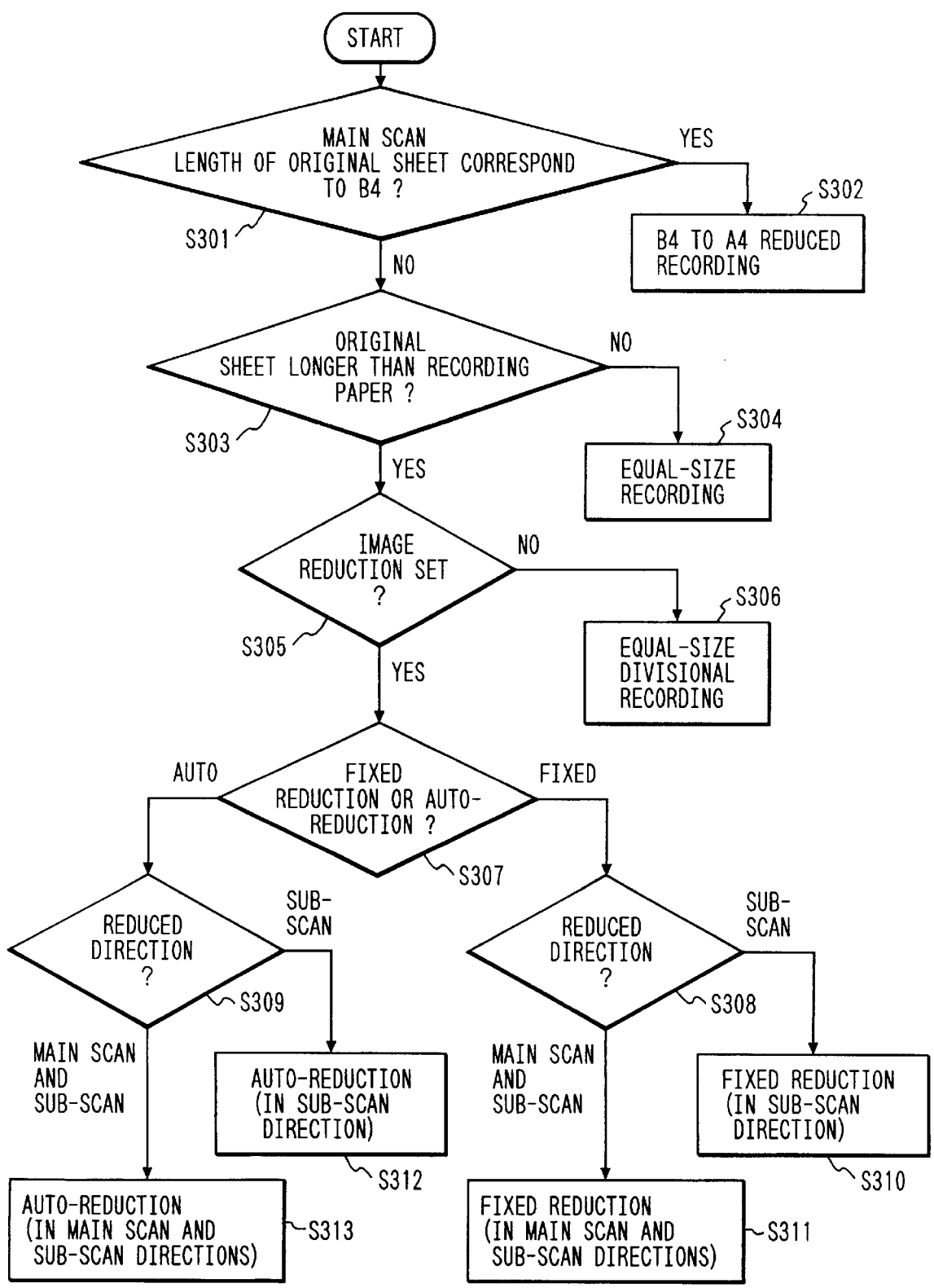
FIG. 14 is a flow chart showing an image reduction process in a fifth embodiment.

In the following there will be explained the image reduction process in the facsimile apparatus of a 5th embodiment, with reference to a flow chart in FIG. 14.

At first a step S301 discriminates whether the main scanning width of the received/read original corresponds to B4 size, and, if affirmative, a step S302 effects reduction recording from B4 size to A4. If not, a sequence starting from a step S303 effects operations similar to those in the 4th embodiment.

[6th embodiment]

Figure 15:
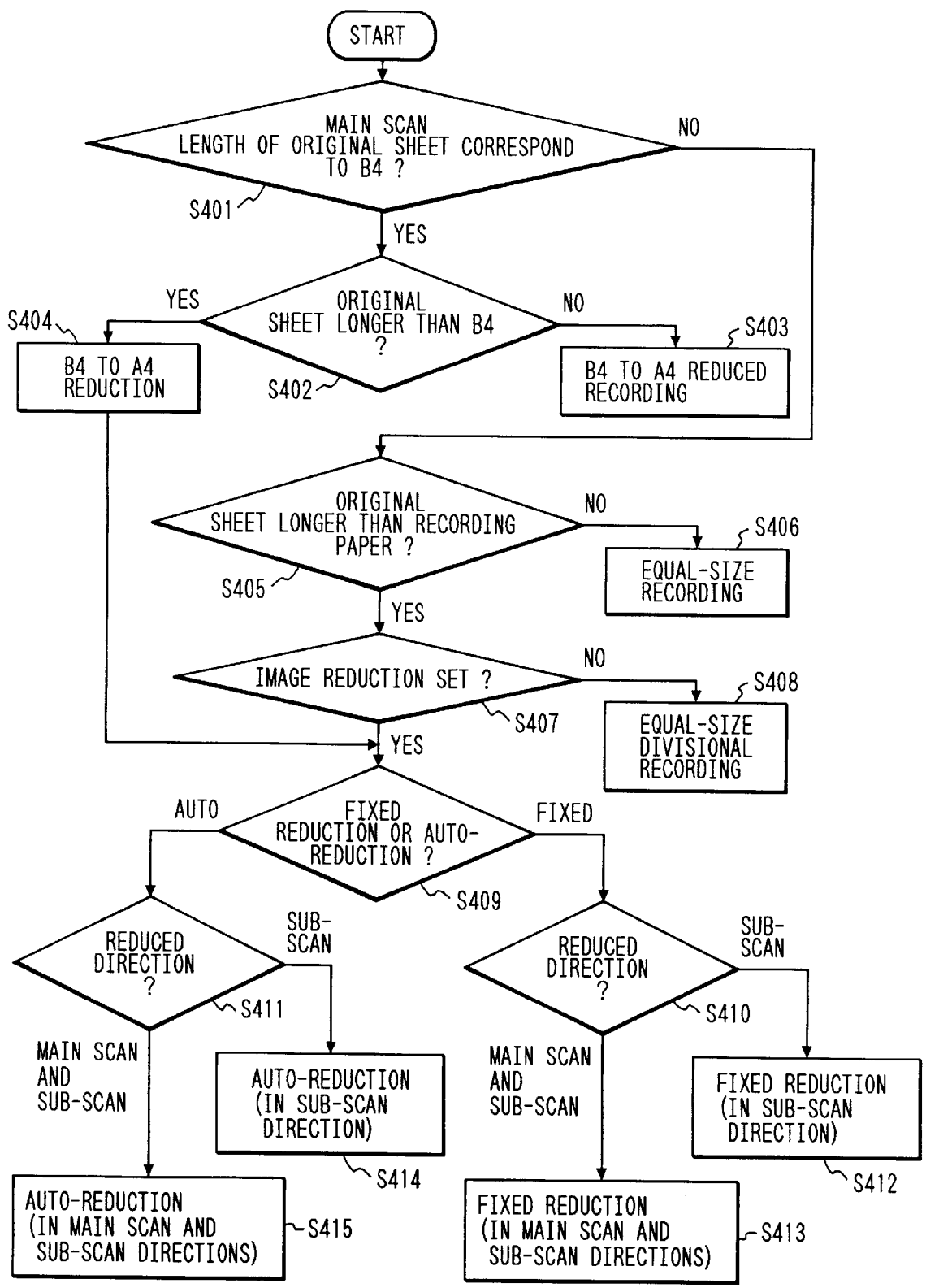
FIG. 15 is a flow chart showing an image reduction process in the sixth embodiment.

In the following there will be explained the image reduction process in the facsimile apparatus of a 6th embodiment, with reference to a flow chart in FIG. 15.

At first a step S401 discriminates whether the main scanning width of the received/read original corresponds to B4 size, and, if affirmative, a step S402 discriminates whether the length of the received/read original is larger than that of B4 size, and, if not, a step S403 effects reduction recording from B4 size to A4.

If the length of the received/read original is larger than that of B4 size, a step effects reduction recording from B4 size to A4, and then a sequence starting from a step S409 effects operations similar to those in the sequence of the 4th embodiment, starting from the step S307.

If the main scanning width of the received/read original does not correspond to B4 size, a sequence starting from a step S405 effects operations similar to those in the sequence of the 4th embodiment, starting from the step S303.

[7th embodiment]

Figure 16:
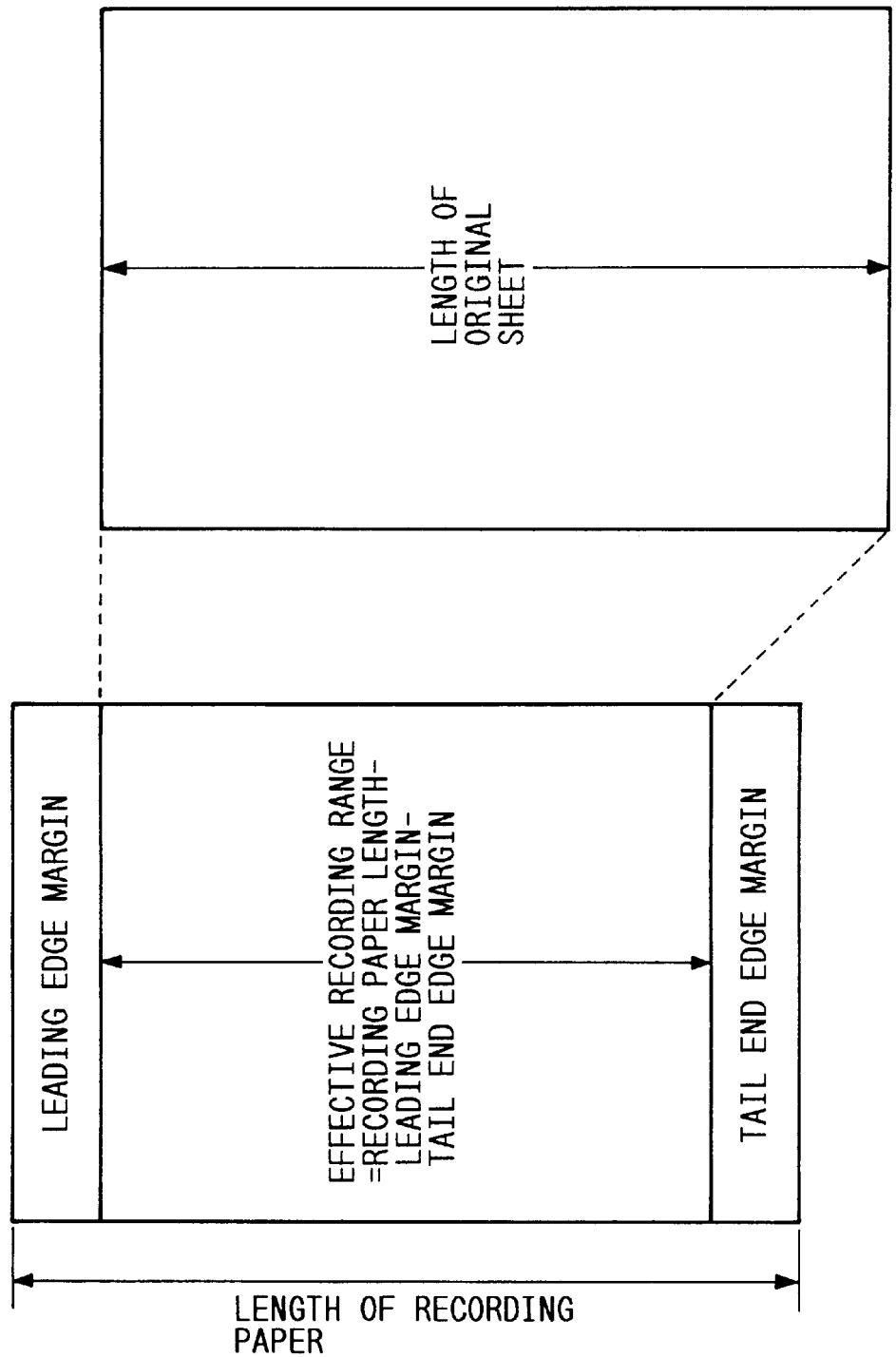
FIG. 16 is a view showing the effective recording range in a seventh embodiment.

Now the facsimile apparatus constituting a 7th embodiment will be explained with reference to FIG. 16.

In this embodiment, in the determination of the reduction factor by comparison of the length of the received/read original and that of the recording sheet, the effective recording range, indicating the recordable length on the recording sheet, is taken as the length of the recording sheet.

More specifically, the effective recording range indicates the length of the recording sheet minus the leading end margin and the trailing end margin.

[8th embodiment]

Figure 17:
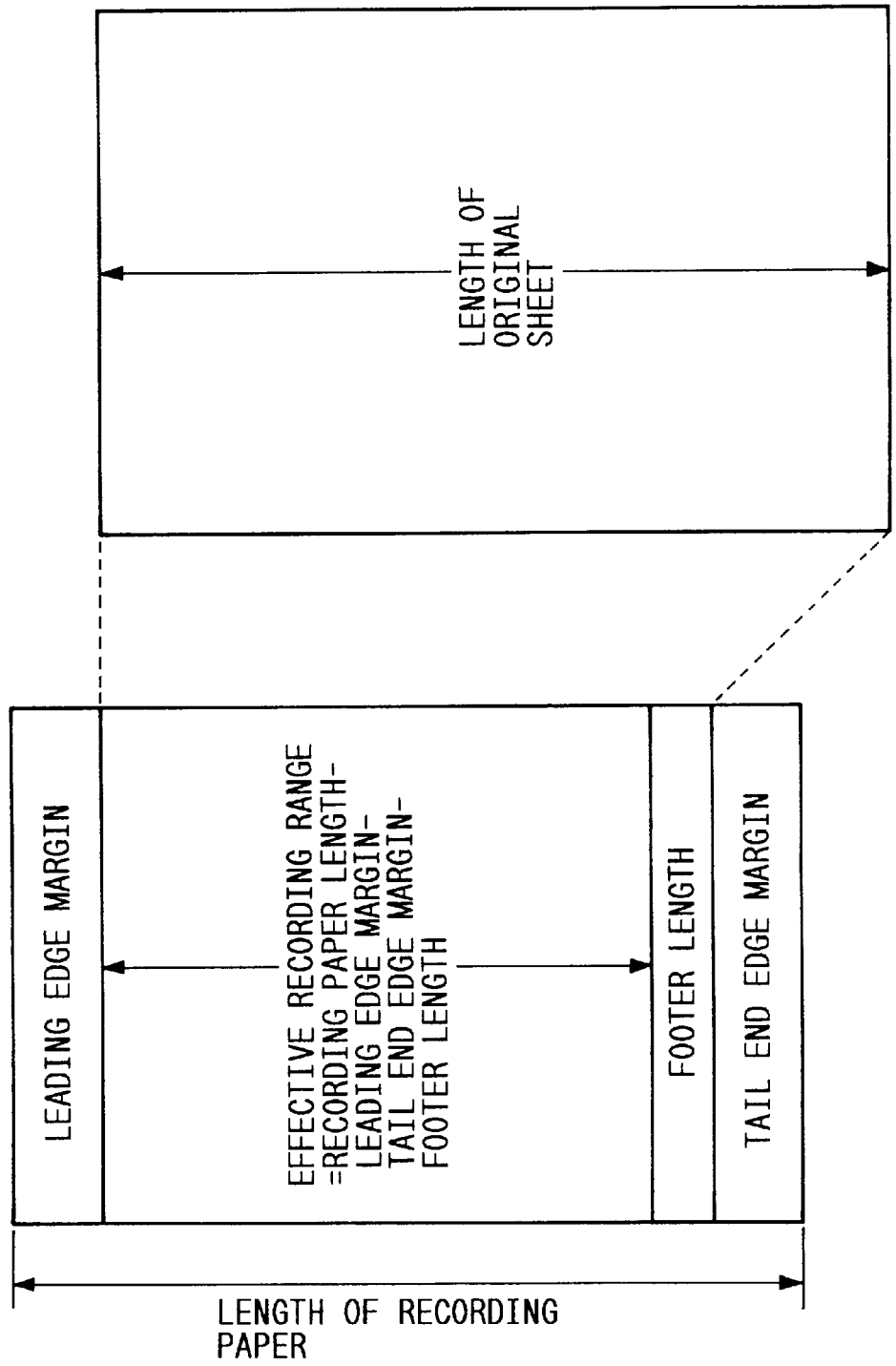
FIG. 17 is a view showing the effective recording range in an eighth embodiment.

Now the facsimile apparatus constituting an 8th embodiment will be explained with reference to FIG. 17.

In case a footer, or the record of the received information, is to be attached to the recorded image, the reduction factor is determined by taking the effective recording range, which corresponds to the length of the recording sheet after deduction of the leading end margin, trailing end margin and length of the footer, as the length of the recording sheet.

[9th embodiment]

Figure 18:
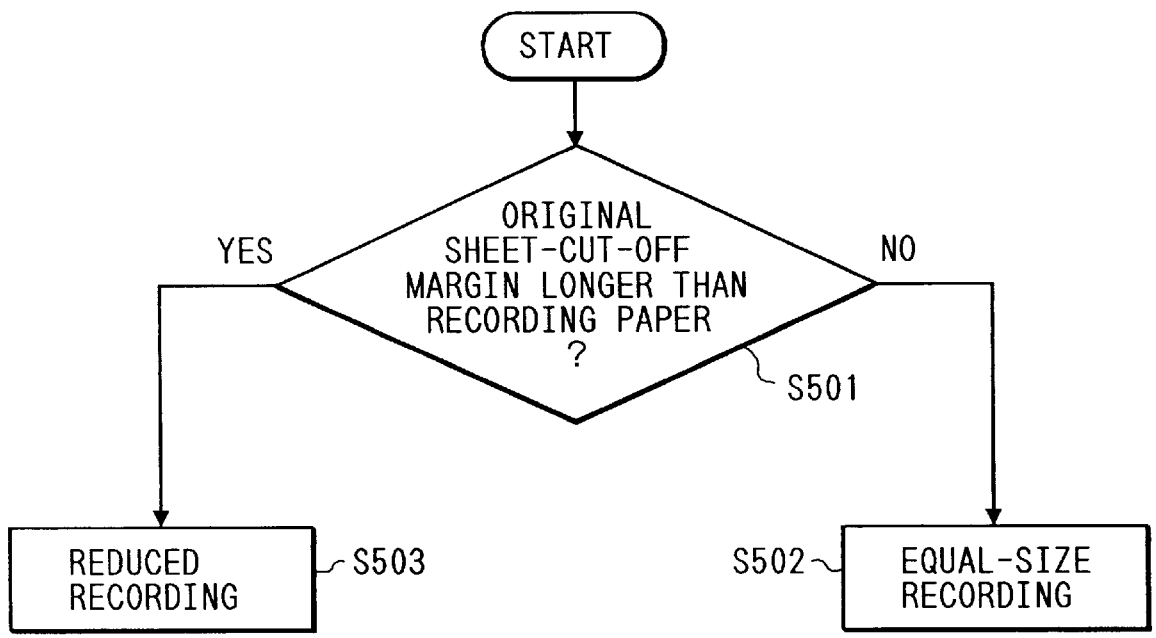
FIG. 18 is a flow chart showing an image reduction process in a ninth embodiment.

There will be explained, with reference to a flow chart in FIG. 18, the operation taking a cut-off width into account, in the facsimile apparatus of a 9th embodiment.

At first a step S501 discriminates whether the received/read original and the recording sheet are different in size, and, if the length of the received/read original minus the cut-off width is equal to or smaller than the length of the recording sheet, a step S502 effects equal-size recording. In case the length of the received/read original is larger than that of the recording sheet but the length of the received/read original minus the cut-off width is equal to or smaller than the length of the recording sheet, a part of the image is discarded for the equal-size recording in the step S502. On the other hand, if the length of the received/read original minus the cut-off width is larger than the length of the recording sheet, a step S503 effects reduction recording.

[10th embodiment]

Figures 19, 19A:
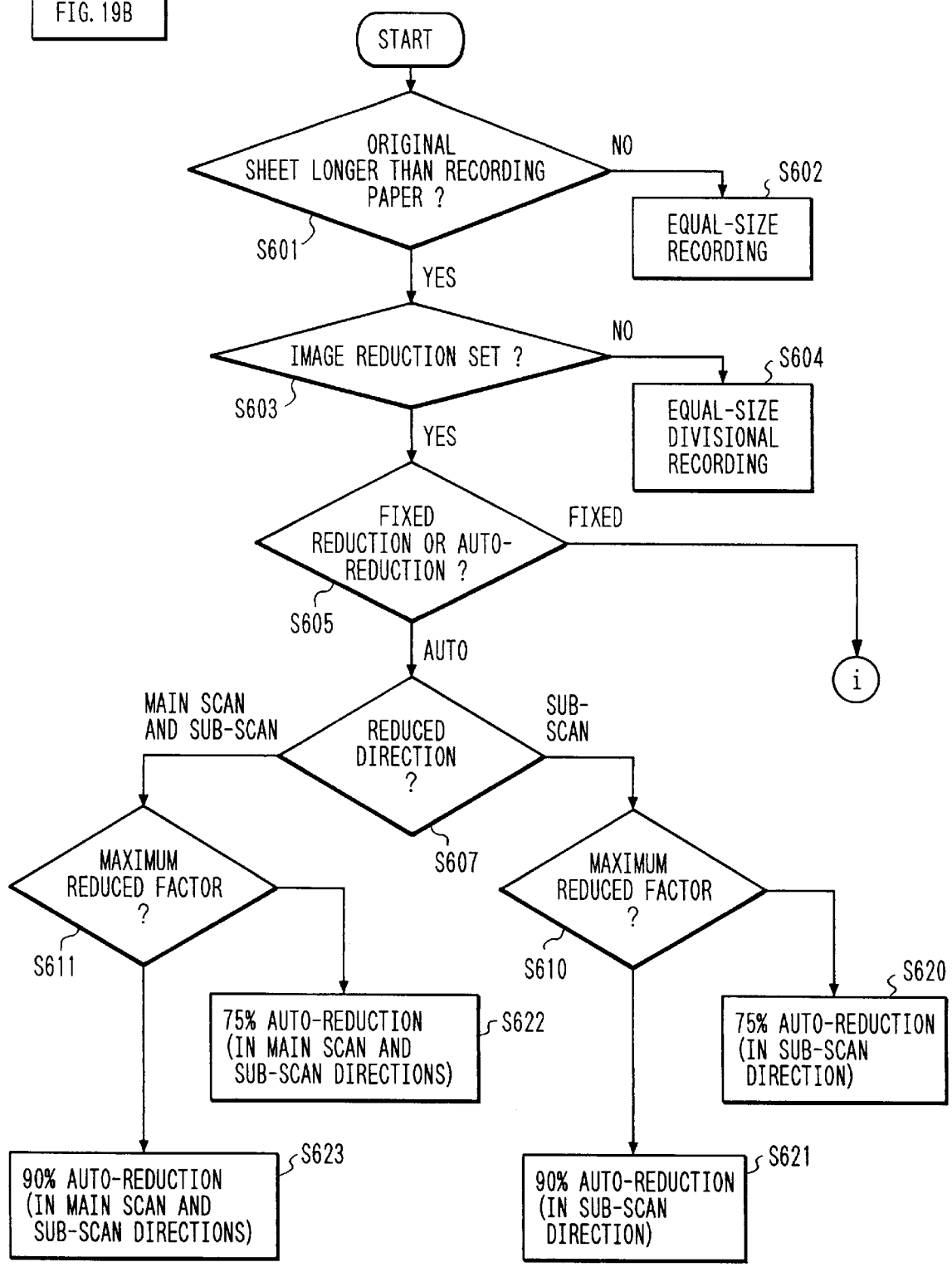
FIGS. 19A and 19B, combined as shown in FIG. 19, are flow charts showing an image reduction process in a tenth embodiment.
Figure 19B:
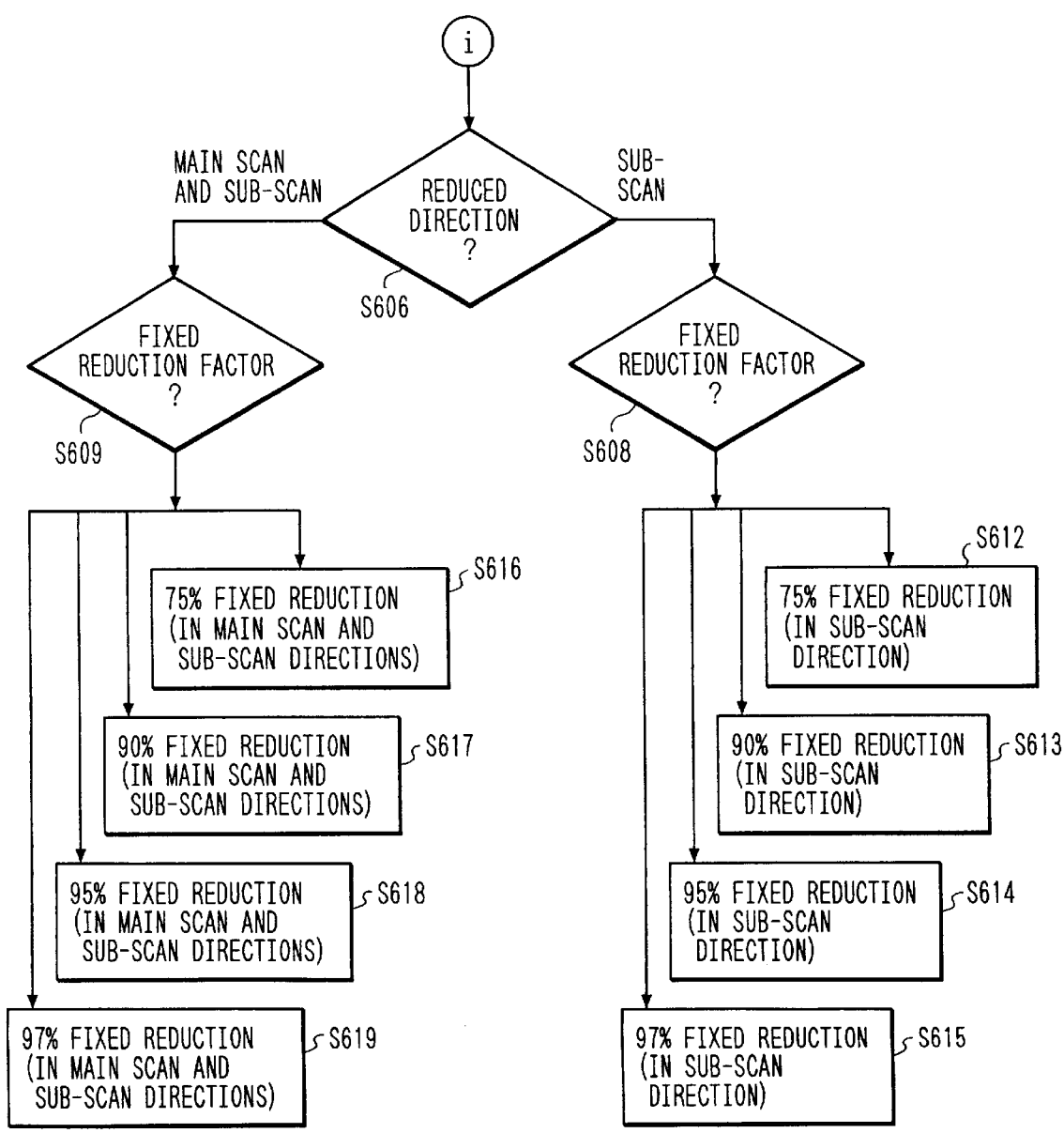

The image reduction recording operation in the facsimile apparatus of a 10th embodiment will be explained with reference to flow charts in FIGS. 19A and 19B.

At first a step S601 discriminates whether the received/read original and the recording sheet are different in size, and, if the length of the received/read original is equal to or smaller than that of the recording sheet, a step S602 effects equal-size recording.

If the length of the received/read original is larger than that of the recording sheet, the CPU 101 discriminates, in a step S603, whether the image reduction is selected or not, according to the content of the SRAM 103, and, if the image reduction is not selected, a step S604 effects equal-size divided recording.

If the image reduction is selected, the CPU 101 discriminates, in a step S605, whether fixed reduction or auto reduction is selected, according to the content of the SRAM 103. In case of the fixed reduction, the CPU 101 discriminates, in a step S606, whether a "vertical only" mode for effecting image reduction only in the sub scanning direction or a "both vertical/horizontal" mode for effecting image reduction both in the main and sub scanning directions, according to the content of the SRAM 103. In case of the "vertical only" mode for effecting image reduction only in the sub scanning direction, the CPU 101 confirms the setting of the fixed reduction factor, in a step S608, according to the content of the SRAM 103, and a step S612, S613, S614 or S615 effects fixed reduction recording with a fixed reduction factor only in the sub scanning direction, corresponding respectively to a step fixed reduction factor of 75%, 90% 95% or 97%.

In case of the "both vertical/horizontal" mode for effecting image reduction both in the main and sub scanning directions, the CPU 101 confirms, in a step S609, the setting of the fixed reduction factor, according to the content of the SRAM 103, and a step S616, S617, S618 or S619 effects fixed reduction recording with a fixed reduction factor both in the main and sub scanning directions, corresponding respectively to a set fixed reduction factor of 75%, 90%, 95% or 97%.

Also in case of the auto reduction, the CPU 101 discriminates, in a step S607, whether a "vertical only" mode for effecting image reduction only in the sub scanning direction or a "both vertical/horizontal" mode for effecting image reduction both in the main and sub scanning directions, according to the content of the SRAM 103. In case of the "vertical only" mode for effecting image reduction only in the sub scanning direction, the CPU 101 confirms, in a step S610, the maximum reduction factor auto reduction, according to the content of the SRAM 103, and, in case the maximum reduction factor for auto reduction is 75% or 90%, a step S620 or S621 respectively determines the image reduction factor within a range not exceeding said maximum reduction factor by comparing the length of the received/read original and that of the recording sheet and effects auto reduction recording only in the sub scanning direction.

In case of the "both vertical/horizontal" mode for effecting image reduction both in the main and sub scanning directions, the CPU 101 confirms, in a step S611, the maximum reduction factor for auto reduction, according to the content of the SRAM 103, and, in case the maximum reduction factor for auto reduction is 75% or 90%, a step S622 or S623 respectively determines the image reduction factor within a range not exceeding said maximum reduction factor by comparing the length of the received/read original and that of the recording sheet and effects auto reduction recording both in the main and sub scanning directions.

[11th embodiment]

In this embodiment, the calculation of the cassette information according to the 1st embodiment is conducted, based on the setting by the operator.

In this embodiment, controls same as those in the 1st embodiment are represented by same symbols and will not be explained further.

FIG. 20 shows the items to be set by the operator, who sets a value for each item. The initially set values are indicated by marks *.

Figure 21:
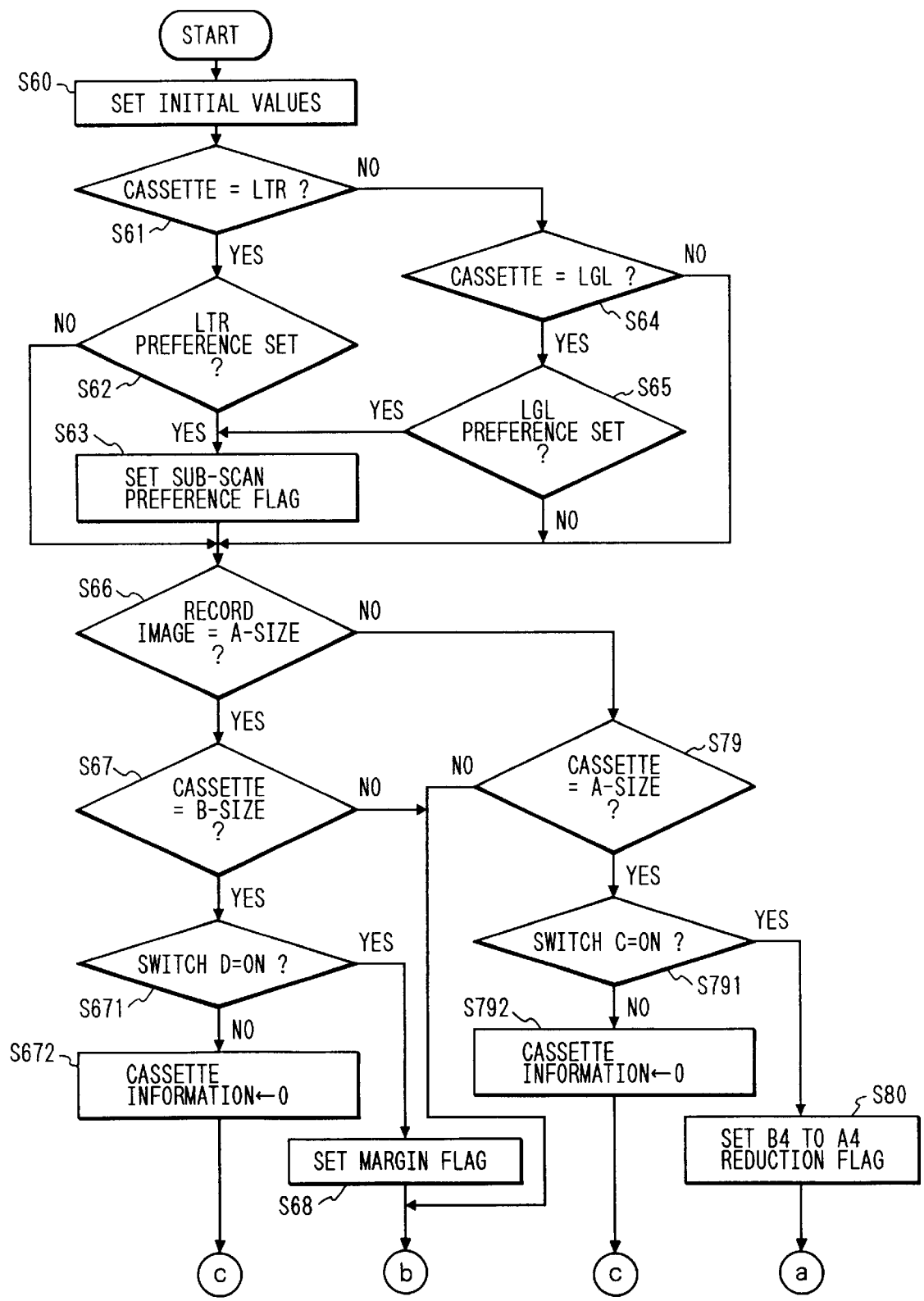

Now referring to FIG. 21, a step S671 discriminates whether a switch D is set to ON, and, if ON, the sequence proceeds to a step S68. If OFF, a step S672 sets 0 as the cassette information and the sequence proceeds to a step S951 in FIG. 24A.

Then a step S791 discriminates whether a switch C is set to ON, and, if ON, the sequence proceeds to a step S80. If OFF, a step S792 sets 0 as the cassette information and the sequence proceeds to the step S951 in FIG. 24A.

Figure 22:
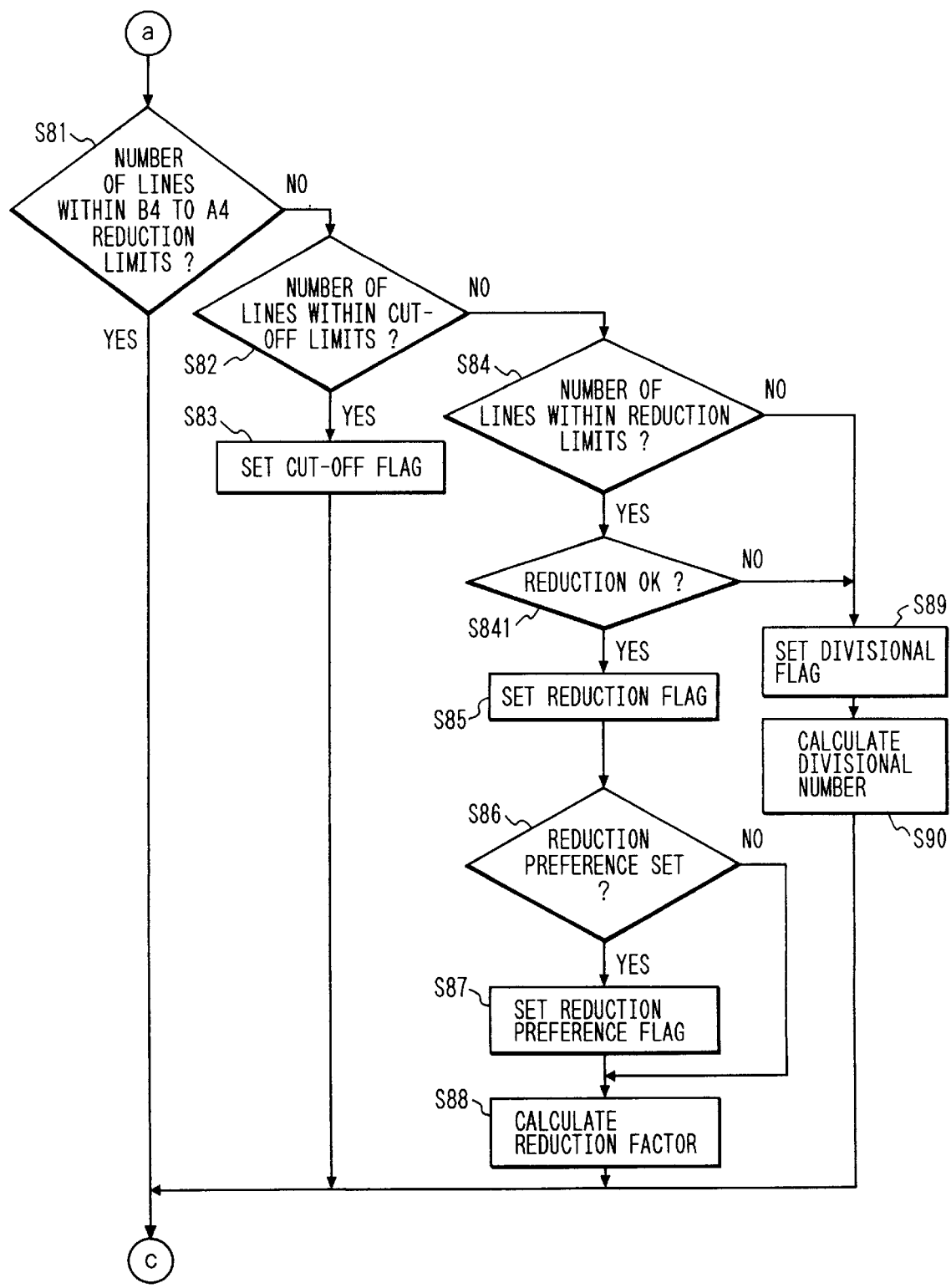

Then a step S841 in FIG. 22 discriminates whether the image reduction in FIG. 20 is selected or not, and the sequence proceeds to a step S85 or S89 respectively if the image reduction is selected or not.

Figure 23:
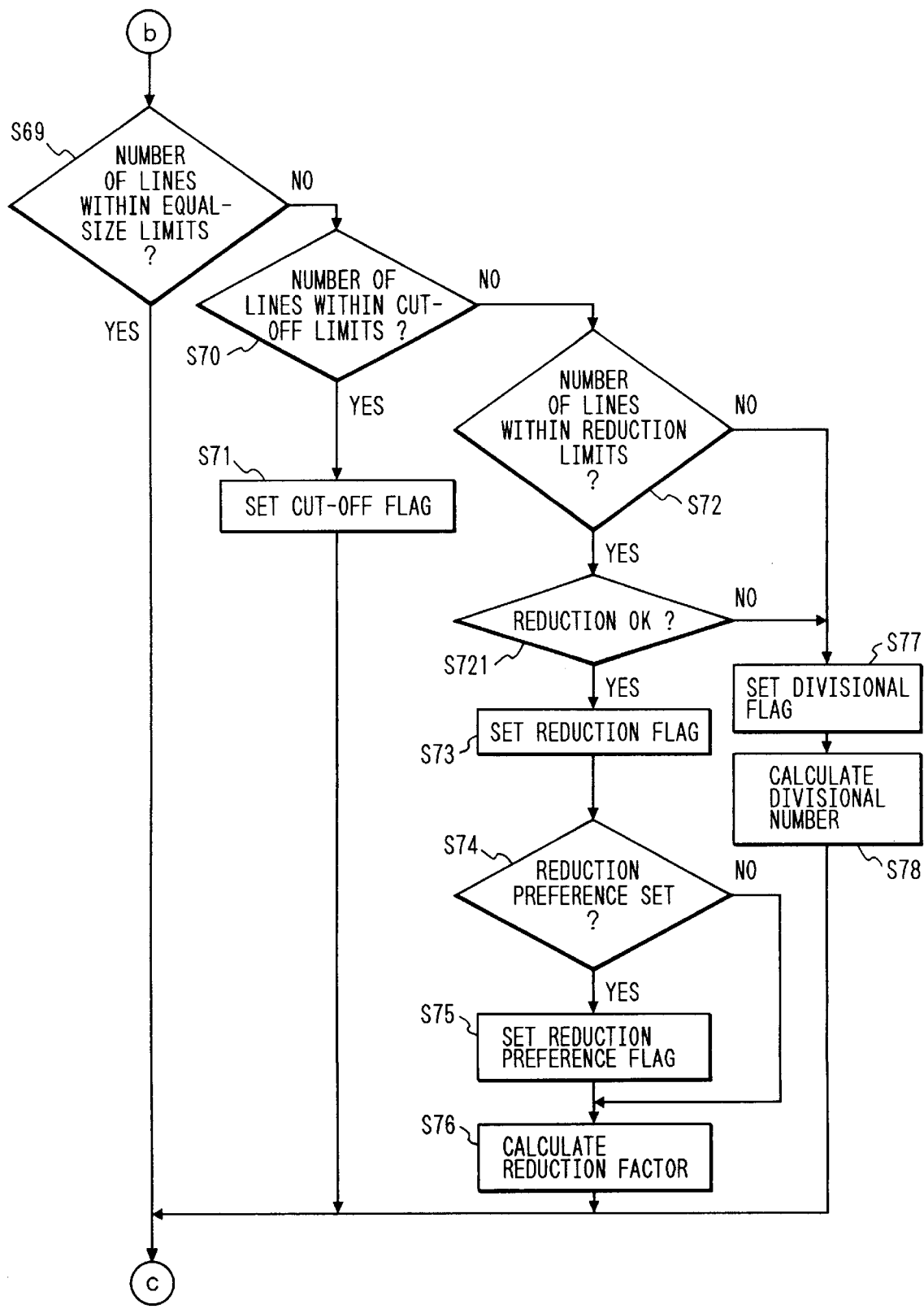

Also a step S721 in FIG. 23 discriminates whether the image reduction in FIG. 20 is selected or not, and, the sequence proceeds to a step S73 or S77 respectively if the image reduction is selected or not.

Figure 24B:
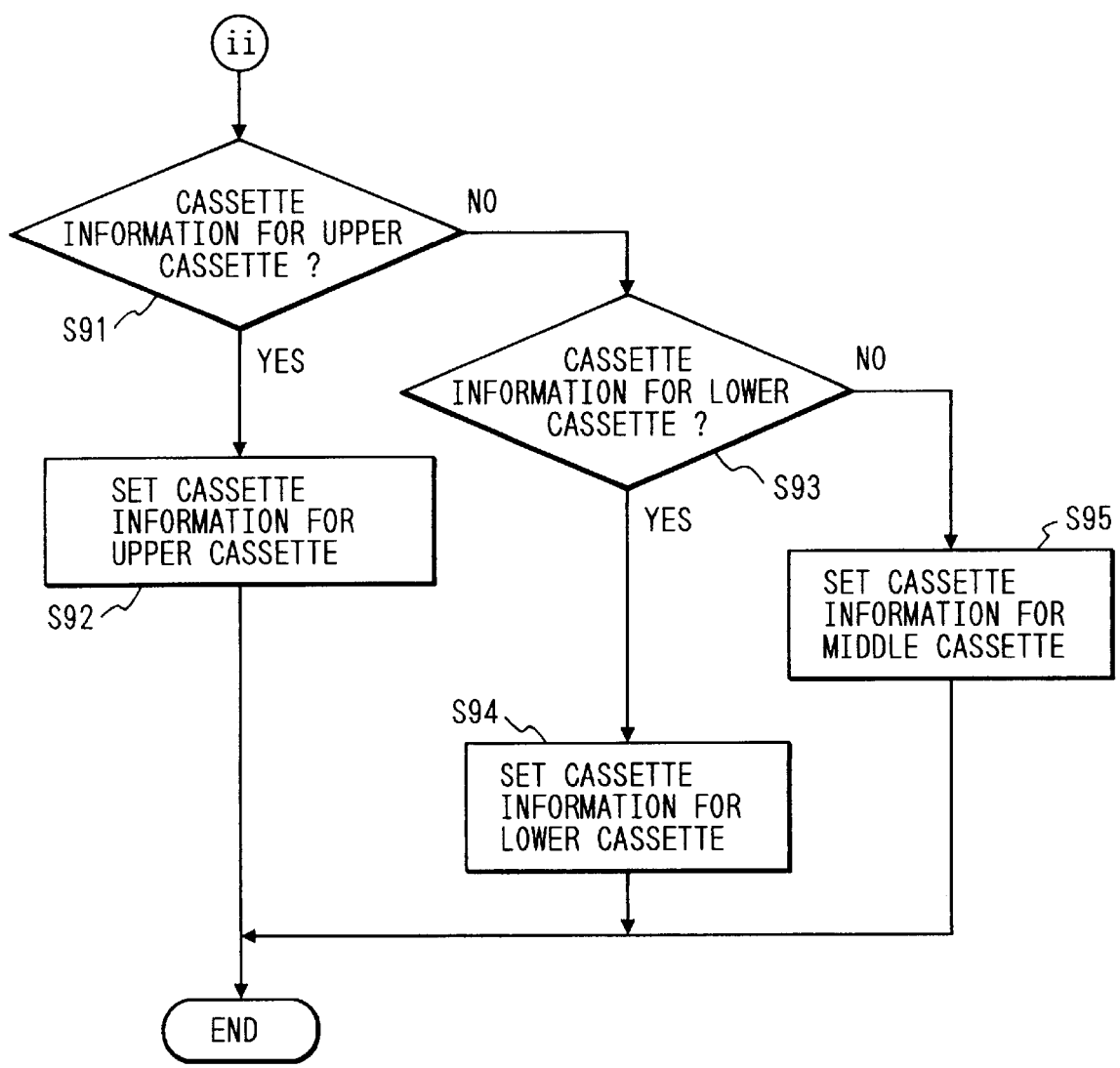

The step S951 in FIG. 24A discriminates whether a division flag has been set as 0 in the step S89 in FIG. 22 or the step S77 in FIG. 23 (division flag=1: i.e. YES / division flag=0, i.e. No.; cf. FIG. 8), and the sequence proceeds to a step S960 or S952 respectively if the division flag has been set at 0 or not. The step S960 discriminates whether a switch A is set to ON, and the sequence proceeds to a step S952 or S961 respectively ON or OFF. The step S961 discriminates whether the cassette is of A5 size, and the step S962 discriminates whether the cassette is of B5 size. If the discrimination of the step S961 or S962 turns out affirmative, a step S963 sets 0 as the cassette information. If the cassette is neither A5 nor B5, it should be A4 or B4 (or letter or legal size), and the image division becomes necessary as the image is long.

The step S952 discriminates whether equal-size recording is selected in the equal-size/reduction selecting mode in the cassette information, and the sequence proceeds to a step S953 or S91 respectively if the equal-size recording or reduction recording is selected.

The step S953 discriminates whether a switch B is set to ON, and the sequence proceeds to a step S91 or S954 respectively in case of ON or OFF. If the cassette is identified as A5 or B5 size in steps S954, S955 and S958, the sequence proceeds to the step S91. Otherwise steps S956 and S959 discriminate whether the sub scanning length of the original image does not exceed A5 or B5 size, and, if it does not exceed A5 or B5 size, a step S957 sets 0 as the cassette information in order to avoid that more than half of an A4-sized or B4-sized recording sheet becomes blank.

What is claimed is:

1. A storage unit selecting method for use in a recording apparatus provided with recording means having plural storage units for containing recording media, the method comprising the steps of:

calculating, at the output-recording of data, storage unit information for each storage unit based on information on the width and length of output data, wherein said storage unit information indicates a result of simulated recording of the output data on a recording medium of predetermined size as stored in each respective one of said storage units;

comparing calculation results among different said storage units according to a table indicating a preference of order based on values on the storage unit information stored in advance; and selecting an optimum storage unit for the recording apparatus according to a result of said comparison.

2. A method according to claim 1, wherein said storage unit information contains at least one of reduction preferential mode, sub scanning preferential mode, reduction factor, divided recording, sheet margin, B4→A4 reduction mode, equal-size recording/reduced recording selecting mode, number of image divisions and storage unit size.

3. A method according to claim 2, wherein the order indicated in the table is (i) a storage unit size allowing equal-size recording, (ii) a storage unit size allowing equal-size recording with a partial cut-off of data, (iii) a storage unit size allowing reduction recording with a margin, (iv) a storage unit size allowing reduction recording, (v) a storage unit size allowing fixed (B4→A4) reduction recording, and (vi) a storage unit size allowing equal-size divided recording.

4. A method according to claim 2, wherein when inhibition of divided recording, recording on a recording sheet having a double size or greater, or fixed reduction recording or recording on a sheet having a record width wider than that of data is registered in accordance with registration information registered by means of selection of a registration switch by a user, said calculation step provides a calculation result of selection-disenable in said selecting step, for the storage unit information corresponding to the respective inhibition based on the registration information as a selection disenable calculation result.

5. A method according to claim 1, wherein said data is image data.

6. A method according to claim 1, wherein said recording apparatus is a facsimile apparatus.

7. A storage unit selecting device for use in a recording apparatus provided with recording means having plural storage units for containing recording media, the device comprising:

calculation means for calculating, at the output-recording of data, storage unit information for each storage unit based on information on the width and length of output data, wherein said storage unit information indicates a result of simulated recording of the output data on a recording medium of predetermined size as stored in each respective one of said storage units;

comparator means for comparing calculation results among different said storage units according to a table indicating a preference of order based on values on the storage unit information stored in advance; and selection means for selecting an optimum storage unit for the recording apparatus according to a result of the comparison performed by said comparator means.

8. A cassette selecting device according to claim 7, wherein said storage unit information contains at least one of reduction preferential mode, sub scanning preferential mode, reduction factor, divided recording, margin, B4→A4 reduction mode, equal-size recording/reduced recording selecting mode, number of image divisions and storage unit size.

9. A cassette selecting device according to claim 8, wherein the order indicated in the table is (i) a storage unit size allowing equal-size recording, (ii) a storage unit size allowing equal-size recording with a partial cut-off of data, (iii) a storage unit size allowing reduction recording with a margin, (iv) a storage unit size allowing reduction recording, (v) a storage unit size allowing fixed (B4→A4) reduction recording, and (vi) a storage unit size allowing equal-size divided recording.

10. A cassette selecting device according to claim 8, wherein when inhibition of divided recording, recording on a recording sheet having a double size or greater, or fixed reduction recording or recording on a sheet having a record width wider than that of data is registered in accordance with registration information registered by means of selection of a registration switch by a user, said calculation step provides a calculation result of selection-disenable in said selecting step, for the storage unit information corresponding to the respective inhibition based on the registration information as a selection disenable calculation result.

11. A device according to claim 7, wherein said data is image data.

12. A device to claim 7, wherein said recording apparatus is a facsimile apparatus.

13. A facsimile apparatus comprising:

reception means for receiving an image transmitted from another apparatus;

memory means for storing the received image;

image reader means for reading an image;

reduction factor calculation means for determining the reduction factor from the sizes of the received/read original and of a recording sheet in said apparatus;

printing means for printing an image in said apparatus;

means for determining a reduction factor by comparing the length of the received/read original and that of the recording sheet so as not to divide the image in case the length of the received/read original is larger than that of the recording sheet and automatically effecting a reduction process; and means for selecting, in case the image reduction is set, the direction of image reduction either in a vertical only mode in which the image reduction is conducted only in the sub-scanning direction or in a vertical/horizontal mode in which the image reduction is conducted both in the main and sub-scanning directions.

14. A facsimile apparatus according to claim 13, further comprising:

means for setting for effecting the image reduction or not by the setting of an operator;

means for setting, in case the image reduction is set, a fixed reduction mode with a fixed reduction factor and an auto reduction mode in which the reduction factor is determined within a range not exceeding a maximum reduction factor through comparison of the length of the received/read original and that of the recording sheet; and means for effecting reduction recording according to the fixed reduction mode or the auto reduction mode set in the facsimile apparatus, in case equal-size recording is not possible.

15. A facsimile apparatus according to claim 13, further comprising:

means for effecting image reduction from B4 size to A4 size both in the main and sub scanning directions, in case the main scanning width of the received/read original corresponds to B4 size while the recording sheet is A4 size.

16. A facsimile apparatus according to claim 14, 13 or 15, further comprising:

means for effecting auto reduction recording or fixed reduction recording according to the setting by the operator, in case the main scanning width of the received/read original corresponds to B4 size while the recording sheet is A4 size, or in case the sub scanning length cannot be accommodated in the A4-size recording sheet in an image reduction from B4 size to A4 size both in the main and sub scanning directions, namely in case the original length of the received/read original is larger than the length of the B4-size recording sheet.

17. A facsimile apparatus according to claim 13, wherein said reduction factor calculation means is adapted, in determination of the reduction factor through comparison of the length of the received/read original and that of the recording sheet, to take an effective recording range, indicating the recordable length on the recording sheet, as the length of the recording sheet.

18. A facsimile apparatus according to claim 14, further comprising:

means for selecting a maximum reduction factor in case the facsimile apparatus is set to the auto reduction mode;

means for effecting reduction recording by determining a reduction factor within a range not exceeding said maximum reduction factor in case equal-size recording is not possible;

means for selecting a fixed reduction factor in case the facsimile apparatus is set to the fixed reduction mode; and means for effecting reduction recording with said fixed reduction factor in case equal-size recording is not possible.

19. A facsimile apparatus according to claim 17, wherein said effective recording range is the length of the recording sheet after deduction of a leading end margin and a trailing end margin.

20. A facsimile apparatus according to claim 19, wherein in case a footer constituting the record of received information is attached to the output image, the effective recording range for determining the reduction factor is defined by the length of the recording sheet after deduction of a leading end margin, a trailing end margin and the length of said footer.

21. A facsimile apparatus according to claim 13, wherein a cut-off width is defined and, in case the length of the recording sheet is smaller than that of the received/read original by a difference not exceeding said cut-off width, said printing means is adapted to effect equal-size recording with a partial cut-off of the image.

22. A facsimile apparatus according to claim 13, wherein said image reduction process is conducted by a reduction process integrated circuit.

* * * * *

UNITED STATES PATENT AND TRADEMARK OFFICE
CERTIFICATE OF CORRECTION

PATENT NO. : 5,959,742

DATED : September 28, 1999

INVENTOR(S) : MASANORI MOMOSE ET AL.

It is certified that error appears in the above-identified patent and that said Letters Patent is hereby corrected as shown below:

On the title page:

AT [56] REFERENCES CITED

FOREIGN PATENT DOCUMENTS

"07231386" should read --07-231386--.

AT [57] ABSTRACT

Line 8, "represent" should read --representing--.

COLUMN 2

Line 41, "and" should be deleted;
Line 44, "embodiment." should read --embodiment;--; and
Line 46, "embodiment." should read --embodiment; and--.

COLUMN 4

Line 66, "of" should read --is of--.

UNITED STATES PATENT AND TRADEMARK OFFICE
CERTIFICATE OF CORRECTION

PATENT NO. : 5,959,742

DATED : September 28, 1999

INVENTOR(S) : MASANORI MOMOSE ET AL.

It is certified that error appears in the above-identified patent and that said Letters Patent is hereby corrected as shown below:

COLUMN 12

Line 9, "to" should read --according to--.

Signed and Sealed this

Eleventh Day of July, 2000

*Attest:*

Q. TODD DICKINSON

*Attesting Officer*     *Director of Patents and Trademarks*